(12) United States Patent
Suzuki et al.

(10) Patent No.: US 8,159,179 B2
(45) Date of Patent: Apr. 17, 2012

(54) BATTERY CHARGING DEVICE, THREE-PHASE VOLTAGE GENERATING CIRCUIT, THREE-PHASE VOLTAGE GENERATION METHOD AND DELAY ANGLE CONTROL METHOD

(75) Inventors: Hidenori Suzuki, Hanno (JP); Tatsuya Arai, Hanno (JP); Takeshi Yanagisawa, Sakado (JP); Atsuo Ota, Fujimino (JP)

(73) Assignees: Shindengen Electric Manufacturing Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 386 days.

(21) Appl. No.: 12/294,360

(22) PCT Filed: Mar. 29, 2007

(86) PCT No.: PCT/JP2007/056913
§ 371 (c)(1),
(2), (4) Date: Sep. 24, 2008

(87) PCT Pub. No.: WO2007/114272
PCT Pub. Date: Oct. 11, 2007

(65) Prior Publication Data
US 2009/0160408 A1    Jun. 25, 2009

(30) Foreign Application Priority Data
Mar. 30, 2006  (JP) .................................. 2006-095504

(51) Int. Cl.
*H02J 7/14* (2006.01)
(52) U.S. Cl. ........................... 320/104; 320/148; 363/87

(58) Field of Classification Search .................. None
See application file for complete search history.

(56) References Cited

U.S. PATENT DOCUMENTS

| | | | |
|---|---|---|---|
| 5,739,677 A | | 4/1998 | Tsutsui et al. |
| 5,886,893 A | * | 3/1999 | Asai et al. ..................... 363/161 |
| 6,049,194 A | | 4/2000 | Nakagawa et al. |
| 2005/0093520 A1 | * | 5/2005 | Muramatsu et al. ............ 322/29 |

FOREIGN PATENT DOCUMENTS

JP    4-210739 A    7/1992
(Continued)

*Primary Examiner* — Melissa Koval
*Assistant Examiner* — Robert Grant
(74) *Attorney, Agent, or Firm* — Arent Fox LLP

(57) ABSTRACT

In the battery charging device of the present invention, a U, V, W phase voltage generating circuit detects a voltage signal of a U phase sub-coil of a three-phase alternating current generator, and generates a signal of a triangular wave that is in synchronization with the U phase. Moreover, a first triangular wave is generated in synchronization with a phase from 0° to 180° of the U phase rectangular wave, and a second triangular wave is generated in synchronization with a phase from 180° to 360° of the U phase. In addition, a V phase rectangular wave is generated in which the level is inverted at a voltage point of two thirds the peak voltage of the first triangular wave, and in which the level is inverted at a voltage point of two thirds the peak voltage of the second triangular wave, and a W phase rectangular wave is generated in which the level is inverted at a voltage point of one third the peak voltage of the first triangular wave, and in which the level is inverted at a voltage point of one third the peak voltage of the second triangular wave.

9 Claims, 11 Drawing Sheets

FOREIGN PATENT DOCUMENTS

| | | |
|---|---|---|
| JP | 8-298731 A | 11/1996 |
| JP | 10-052046 A | 2/1998 |
| JP | 11-46456 A | 2/1999 |
| JP | 11-136998 A | 5/1999 |
| JP | 2000-188866 A | 7/2000 |
| JP | 2004-140927 A | 5/2004 |
| JP | 2004-194427 A | 7/2004 |

* cited by examiner

BATTERY CHARGING DEVICE, THREE-PHASE VOLTAGE GENERATING CIRCUIT, THREE-PHASE VOLTAGE GENERATION METHOD AND DELAY ANGLE CONTROL METHOD

TECHNICAL FIELD

The present invention relates to a battery charging device that employs a three-phase alternating current generator and is employed in a two-wheeled vehicle. In particular, the present invention relates to a battery charging device, a three-phase voltage generating circuit, a three-phase voltage generation method, and a delay angle control method that, in a battery charging device that performs advance angle/delay angle control, makes it possible to achieve a reduction in both the complexity and size of the structure of a three-phase alternating current generator, and that is able to automatically set a delay angle limit value.

Priority is claimed on Japanese Patent Application No. 2006-95504, filed Mar. 30, 2006, the content of which is incorporated herein by reference.

BACKGROUND ART

FIG. 11 is a view illustrating a battery charging device used in a two-wheeled vehicle and the like.

A permanent magnet type (a type in which a rotor is formed by a permanent magnet) of three-phase alternating current generator (referred to below simply as an 'alternating current generator') 1A is an alternating current generator that is driven to rotate from an engine side (not shown), and three-phase alternating current output voltage that is output from the alternating current generator 1A is rectified (undergoes alternating current/direct current conversion) by a battery charging device 3A so as to become direct current output voltage, and charging current is supplied to a battery 2 by the direct current output voltage. In this case, in order for the battery charging to be performed efficiently, advance angle/delay angle control is conducted which controls the power generation amount of the alternating current generator 1A.

As is shown in FIG. 12, in advance angle/delay angle control, the amount of power generated by the alternating current generator 1A is controlled by moving to the advance angle side or to the delay angle side the energization timing of switching elements that constitute a rectifying portion in a battery charging device, relative to the phase of the alternating current output voltage of the alternating current generator 1A. In this advance angle/delay angle control, when the voltage of the battery 2 is lower than a reference voltage and requires battery charging, delay angle control is performed on the battery charging device 3A and the battery is charged, while when the voltage of the battery 2 is higher than the reference voltage and does not require battery charging, advance angle control is performed on the battery charging device 3A and energy is discharged from the battery to the alternating current generator 1A.

In this advance angle/delay angle control, in a battery charging device that is used in combination with a conventional three-phase alternating current magnetic type of three-phase alternating current generator 1A, control of the energization timing of switching elements (either FET or SCR) is performed by performing phase detection of the output voltage of each phase, which is necessary for the advance angle/delay angle control, using signals from elements (hole elements or the like) that convert magnetic field into current or from sub-coils (auxiliary coils for detecting alternating current output voltage) that are wound in parallel with each phase coil. Because of this, it has been necessary to either provide sub-coils or provide individual magnet position detectors in each phase.

For example, as is shown in FIG. 13, sub-coils Su, Sv, and Sw are provided in each phase of the alternating current generator 1A, and a signal is generated in synchronization with the alternating current output voltage from each one of a U phase, a V phase, and a W phase by a U, V, W phase voltage detection circuit 11A. Taking this synchronous signal as a reference, advance angle/delay angle control is performed by controlling the energization timings of switching elements (FET) Q1 to Q6 using a control circuit 20A.

In this manner, because it is necessary to provide either a sub-coil or a magnet position detector in each phase of the alternating current generator in order to perform the advance angle/delay angle control, the alternating current generator ends up being large and complex, and is consequently expensive. Accordingly, reductions in both the size and complexity of an alternating current generator are desired.

Moreover, as has been described above, in a delay angle control state, it is possible to gradually increase the power generation amount (the battery charging amount) by increasing the delay angle amount from 0. However, although it is possible to raise the power generation amount up to a particular fixed delay angle amount, if this fixed delay angle amount is exceeded, then, conversely, there ends up being a reduction in the power generation amount. Accordingly, it is necessary to set the value of the limit of the delay angle amount (referred to below on occasion as the 'delay angle limit value') to a suitable value where the amount of power generated by the alternating current generator 1 is at the maximum.

The setting of this delay angle limit value is conventionally performed by performing combined tests (experiments) in accordance with the alternating current generator that is actually being used, the type of battery, and the size of the engine (the displacement), and thus determining the optimum delay angle limit value.

In this manner, a large number of tests are carried out in order to determine the optimum delay angle limit value, requiring considerable labor including making tables showing corresponding relationships between the delay angle limit values, the alternating current generators, the batteries, and the displacements determined from the results.

This conventional type of power supply apparatus is described in Patent documents 1 and 2. The power supply apparatus of this conventional technology aims to efficiently acquire output from an alternating current generator when the output from an alternating current generator is converted into a commercial frequency using a cycloconverter. Accordingly, it is necessary to provide a magnet position detector and sub-coil for each phase in order to perform the advance angle/delay angle control such as is described above Thus, the problem of the three-phase alternating current generator being large and complex is not solved.

Moreover, an output control device of a synchronous motor of the conventional technology is disclosed in Patent document 3. The conventional technology has the objects of eliminating unnecessary power generation by controlling fluctuations in the power generation amount, and performing battery charging properly while maintaining a superior acceleration performance. Because of this, the control voltage value that is used to control the generated voltage is set as a function of the engine speed for accelerating and for normal running. Namely, the control voltage value is decided in accordance with a determination of acceleration which is made based on the engine speed and the throttle opening angle, and an advance angle/delay angle amount setting section determines the energization timing to each phase of the stator coil such that the battery voltage is converged to the control voltage value.

However, the above described output control device for a synchronous motor of the conventional technology aims to perform battery charging properly while maintaining a superior acceleration performance, and is not intended to solve the problem of excessive labor being required in order to set the optimum delay angle limit value in accordance with the combination of the alternating current generator, the type of battery, and the displacement.

[Patent document 1] Japanese Unexamined Patent Application, First Publication No. 2000-188866
[Patent document 2] Japanese Unexamined Patent Application, First Publication No. H 10-52046
[Patent document 3] Japanese Unexamined Patent Application, First Publication No. 2004-194427

DISCLOSURE OF INVENTION

Problem to be Solved by the Invention

As has been described above, in a conventional battery charging device, in order to perform the advance angle/delay angle control, because it has been necessary to provide a sub-coil in each phase of a three-phase alternating current generator or to provide a magnet position detector, the problem has existed that the alternating current power generator is large and complex, which has resulted in it being expensive.

Moreover, in a conventional battery charging device, in the setting of the delay angle limit value of the advance angle/delay angle control, an optimum limit value is determined using predetermined combined tests of the alternating current generator, the battery, and the load which are actually used. Because of this, considerable labor has been necessary in order to set the optimum delay angle limit value in accordance with the alternating current generator, the type of battery, and the size of the displacement.

The present invention was conceived in order to solve the above described problems and it is a first object thereof to provide a battery charging device, a three-phase voltage generating circuit, and a three-phase voltage generation method that make it possible to achieve a simplification in structure, a reduction in size, and a reduction in cost of an alternating current generator when advance angle/delay angle control of a three-phase alternating current generator is being performed using a battery charging device.

Moreover, in addition to the above described first object, a second object of the present invention is also to provide a battery charging device, and a delay angle control method that make it possible to automatically set an optimum delay angle limit value irrespective of the alternating current generator, the type of battery, and the size of the engine (the displacement).

Means for Solving the Problem

The present invention was achieved in order to solve the above described problems and a battery charging device of the present invention is connected between a three-phase alternating current generator having U, V, and W phases and a battery, and is constructed so as to convert alternating current power output from the three-phase alternating current generator into direct current power and supply the direct current power to the battery, and that performs advance angle/delay angle control by either advancing or delaying an energization timing to switching elements of a rectifier portion having a bridge configuration relative to a phase of the alternating current output voltage from the three-phase alternating current generator, and the battery charging device includes: an alternating current output voltage detection circuit that detects an alternating current output voltage of any one phase of the three-phase alternating current generator; a U, V, W phase voltage generating circuit that generates a synchronous signal that is in synchronization with an alternating current output voltage of the one phase that is detected by the alternating current output voltage detection circuit, and generates synchronous signals of the other two phases based on the synchronous signal of the one phase; an advance angle/delay angle calculation circuit that determines an advance angle/delay angle amount of the energization timing to the switching elements based on a signal of a differential voltage between a voltage of the battery and a predetermined target voltage, and the synchronous signals of the each phase that are output by the U, V, W phase voltage generating circuit; and an advance angle/delay angle control circuit that performs the advance angle/delay angle control of the switching elements using the advance angle/delay angle amount determined by the advance angle/delay angle calculation circuit.

In a battery charging device that is constructed in this manner, when generating a synchronous signal of each phase that is necessary for advance angle/delay angle control, the alternating current output voltage of any one phase, for example, the U phase of the three-phase alternating current generator is detected, a signal is generated that is in synchronization with the alternating current output voltage of this U phase, and synchronous signals of the other two phases are generated based on this U phase synchronous signal.

As a result, it is possible to detect the alternating current output voltage of one phase of the three-phase alternating current generator and perform advance angle/delay angle control without having to provide individual magnet position detectors or sub-coils in each phase of the three-phase alternating current generator. Because of this, it is possible to achieve a simplification in the structure, a reduction in size, and a reduction in cost of an alternating current generator.

Moreover, in the battery charging device of the present invention: the alternating current output voltage detection circuit may detect an alternating current output voltage of the U phase; and the U, V, W phase voltage generating circuit may include a circuit that generates a rectangular wave signal that is in synchronization with the alternating current output voltage of the U phase, a first triangular wave generating circuit that generates a first triangular wave in synchronization with a phase from 0° to 180° of a rectangular wave that is in synchronization with the U phase, a second triangular wave generating circuit that generates a second triangular wave in synchronization with a phase from 180° to 360° of the rectangular wave that is in synchronization with the U phase, a circuit that generates a V phase rectangular wave in which a level is inverted at a voltage point of two thirds a peak voltage of the first triangular wave, and in which the level is inverted at a voltage point of two thirds a peak voltage of the second triangular wave, and a circuit that generates a W phase rectangular wave in which a level is inverted at a voltage point of one third the peak voltage of the first triangular wave, and in which the level is inverted at a voltage point of one third the peak voltage of the second triangular wave.

In a battery charging device that is constructed in this manner, when generating a synchronous signal of each phase that is necessary in order to perform advance angle/delay angle control, in the U, V, W phase voltage generating circuit, a rectangular wave is generated that is in synchronization with the alternating current output voltage of any one phase, for example, with the alternating current output voltage of the U phase of the three-phase alternating current generator, and taking this rectangular wave that is in synchronization with the U phase as a reference, rectangular waves that are in synchronization with the other two phases are generated. In this case, a first triangular wave is generated in synchronization with a phase from 0° to 180° of the signal of the U phase rectangular wave, and a second triangular wave is generated in synchronization with a phase from 180° to 360°. In addition, a V phase rectangular wave is generated in which the level is inverted at a voltage point of two thirds the peak voltage of the first triangular wave, and in which the level is inverted at a voltage point of two thirds the peak voltage of the second triangular wave. Moreover, a W phase rectangular wave is generated in which the level is inverted at a voltage point of one third the peak voltage of the first triangular wave, and in which the level is inverted at a voltage point of one third the peak voltage of the second triangular wave.

As a result, it is possible to detect the alternating current output voltage of any one phase of the three-phase alternating current generator and perform advance angle/delay angle control without having to provide individual magnet position detectors or sub-coils in each phase of the three-phase alternating current generator. Because of this, it is possible to achieve a simplification in the structure, a reduction in size, and a reduction in cost of an alternating current generator.

Moreover, the battery charging device of the present invention may include: a power generation amount calculation circuit that detects an alternating current output voltage and an alternating current output current of one phase of the three-phase alternating current generator, and calculates a power generation amount of the alternating current generator; an advance angle/delay angle control circuit that performs the advance angle/delay angle control of the switching elements using the advance angle/delay angle amount determined by the advance angle/delay angle calculation circuit, and that, when a delay angle amount exceeds a delay angle limit value in case where delay angle control is performed, performs delay angle control of the switching elements using the delay angle limit value; and a delay angle limit value setting circuit that stores the delay angle amount and the power generation amount, and compares a previous delay angle amount and a previous power generation amount with a current delay angle amount and a current power generation amount, and when the current delay angle amount is larger than the previous delay angle amount and the previous power generation amount is larger than the current power generation amount, sets the previous delay angle amount as the delay angle limit value.

By employing the above described structure, when performing advance angle/delay angle control by generating signals that are in synchronization with the U, V, and W phases based on the alternating current output voltage of any one phase of a three-phase alternating current generator, when the advance angle/delay angle amount is a delay angle amount and also exceeds the delay angle amount limit value (a delay angle amount which is substantially the maximum power generation amount), then the delay angle amount is restricted to the delay angle limit value. Moreover, a power generation amount of the power generator is detected, and the delay angle amount and power generation amount are stored. The previous delay angle amount and the previous power generation amount are then compared with the current delay angle amount and the current power generation amount. If the current delay angle amount is greater than the previous delay angle amount, and the previous power generation amount is greater than the current power generation amount, then the previous delay angle amount is set as the delay angle limit value.

As a result, in addition to the effect that it is possible to perform advance angle/delay angle control by detecting the alternating current output voltage of any one phase of a three-phase alternating current generator, it is also possible when performing advance angle/delay angle control to automatically set an optimum delay angle limit value irrespective of the alternating current generator, the type of battery, and the size of the displacement.

Moreover, in the battery charging device of the present invention, the advance angle/delay angle control circuit may perform delay angle control of the switching elements using the determined delay angle amount when the advance angle/delay angle amount determined by the advance angle/delay angle calculation circuit is a delay angle amount, and either the delay angle limit value is not set or the delay angle amount is less than the delay angle limit value; and the delay angle limit value setting circuit may store the delay angle amount and the power generation amount, and compare the previous delay angle amount and the previous power generation amount with the current delay angle amount and the current power generation amount, the delay angle limit value setting circuit may set the previous delay angle amount as the delay angle limit value when the current delay angle amount is larger than the previous delay angle amount and the previous power generation amount is larger than the current power generation amount, and the delay angle limit value setting circuit may cancel a setting of the delay angle limit value when the current delay angle amount is smaller than the previous delay angle amount.

By employing this type of structure, when a delay angle amount that is determined by the advance angle/delay angle calculation circuit is moving in a decreasing direction in case of performing advance angle/delay angle control by generating signals that are in synchronization with the U, V, and W phases based on the alternating current output voltage of any one phase of a three-phase alternating current generator, the setting of the delay angle limit value is cancelled.

As a result, in addition to the effect that it is possible to perform advance angle/delay angle control by detecting the alternating current output voltage of any one phase of a three-phase alternating current generator, it is also possible when performing advance angle/delay angle control to suitably set an optimum delay angle limit value in accordance with changes in the surrounding environment and to avoid making the delay angle limit value a fixed value.

Moreover, the battery charging device of the present invention may include: a sub-coil which detects the alternating current output voltage of the any one phase of the three-phase alternating current generator; a current sensor that detects the alternating current output current of the any one phase of the three-phase alternating current generator; a power generation amount calculation circuit that calculates a power generation amount of the alternating current generator based on the output voltage of the three-phase alternating current generator detected by the sub-coil, and on the output current of the three-phase alternating current generator detected by the current sensor; the U, V, W phase voltage generating circuit that generates a rectangular wave that is in synchronization with the alternating current output voltage of the one phase detected by the sub-coil, and generates rectangular waves that are in synchronization with the other two phases based on the rectangular wave that is in synchronization with the one phase; a synchronous triangular wave generating circuit that generates triangular waves that are in synchronization with the rectangular waves of the respective phases output from the U, V, W phase voltage generating circuit; an error amplifier that compares the voltage of the battery with the predetermined target voltage and outputs an error signal; a comparator circuit that compares the triangular waves output from the synchronous triangular wave generating circuit with an output of the error amplifier; receives the advance angle/delay angle amount from the comparator circuit, and performs advance angle/delay angle control of the switching elements using the advance angle/delay angle amounts, and when the delay angle amount exceeds a predetermined delay angle limit value, the delay angle amount is restricted to the delay angle limit value; and a delay angle limit value setting circuit that stores the delay angle amount determined by the comparator circuit and the power generation amount determined by the power generation amount calculation circuit, and compares a previous delay angle amount and a previous power generation amount with a current delay angle amount and a current power generation amount, and when the current delay angle amount is larger than the previous delay angle amount and the previous power generation amount is larger than the current power generation amount, sets the previous delay angle amount as a delay angle limit value.

By employing this type of structure, a sub-coil is provided in any one phase of a three-phase alternating current generator and alternating current output current is detected. In addition, the alternating current output current of the phase in which the sub-coil is provided is detected by a current sensor and the power generation amount of the three-phase alternating current generator is calculated. Moreover, rectangular waves of the respective phases that are in synchronization with the U, V, and W phases are generated by the U, V, W phase voltage generating circuit based on a voltage waveform detected by the sub-coil, and triangular waves that are in synchronization with these rectangular waves are generated by a synchronous triangular wave generating circuit. Moreover, an error amplifier compares the voltage of the battery with a target voltage and generates error signals. In addition, an advance angle/delay angle amount is determined as a result of a comparator circuit comparing triangular waves output from the synchronous triangular wave generating circuit with the output of the error amplifier. When an advance angle/delay angle amount determined by this comparator circuit is a delay angle and also exceeds a predetermined delay angle limit value, then the delay angle amount is restricted to the delay angle limit value by an advance angle/delay angle limit value control circuit. Moreover, a delay angle limit value setting circuit stores a delay angle amount and a power generation amount, and this circuit also compares the previous delay angle amount and the previous power generation amount with the current delay angle amount and the current power generation amount, and when the current delay angle amount is larger than the previous delay angle amount and also the previous power generation amount is larger than the current power generation amount, sets the previous delay angle amount as the delay angle limit value.

As a result, in addition to the effect that it is possible to perform advance angle/delay angle control by detecting the alternating current output voltage of any one phase of a three-phase alternating current generator, it is also possible when performing advance angle/delay angle control in a battery charging device to automatically set an optimum delay angle limit value irrespective of the alternating current generator, the type of battery, and the size of the displacement.

Furthermore, in the battery charging device of the present invention, the triangular wave in the synchronous triangular wave generating circuit may be generated for each of the U phase, the V phase, and the W phase, and in the comparator circuit, when advance the angle/delay angle amount is determined by comparing the triangular wave output from the synchronous triangular wave generating circuit with the output of the error amplifier, an advance angle/delay angle amount of the U phase may be determined by comparing the triangular wave of the W phase output from the synchronous triangular wave generating circuit with the output from the error amplifier, an advance angle/delay angle amount of the V phase may be determined by comparing the triangular wave of the U phase output from the synchronous triangular wave generating circuit with the output from the error amplifier, and an advance angle/delay angle amount of the W phase may be determined by comparing the triangular wave of the V phase output from the synchronous triangular wave generating circuit with output from the error amplifier.

By employing this type of structure, when performing advance angle/delay angle control by generating signals that are in synchronization with the U, V, and W phases based on the alternating current output voltage of any one phase of a three-phase alternating current generator, for example, the advance angle/delay angle amount of the U phase is determined by comparing a triangular wave of the W phase that is output from the synchronous triangular wave generating circuit with the output of the error amplifier.

As a result, in addition to the effect that it is possible to perform advance angle/delay angle control by detecting the alternating current output voltage of any one phase of a three-phase alternating current generator, it is also possible when performing advance angle/delay angle control to set the control ranges of the advance angle/delay angle control to 0° to 120° for the advance angle side, and to 0° to 60° for the delay angle side.

Furthermore, In a battery charging device that is connected between a three-phase alternating current generator having U, V, and W phases and a battery, and is constructed so as to convert alternating current power output from the three-phase alternating current generator into direct current power and supply the direct current power to the battery, and that performs advance angle/delay angle control by either advancing or delaying an energization timing to switching elements of a rectifier portion having a bridge configuration relative to a phase of the alternating current output voltage from the three-phase alternating current generator, determines an advance angle/delay angle amount of the energization timing to the switching elements based on a signal of a differential voltage between a voltage of the battery and a predetermined target voltage, and synchronous signals of each phase of the alternating current output voltage from the three-phase alternating current generator, a three-phase voltage generating circuit of the present invention that generates the synchronous signals of the each phase of the alternating current output voltage, and the three-phase voltage generating circuit includes: a circuit that, based on a signal of the alternating current output voltage of any one phase of the three-phase alternating current generator, generates a signal that is in synchronization with the one phase; and a circuit that generates synchronous signals of the other two phases based on the synchronous signal of the one phase.

In a three-phase alternating current generator that is constructed in this manner, when generating a synchronous signal of each phase that is necessary for performing advance angle/delay angle control using a battery charging device, the alternating current output voltage of any one phase, for example, the U phase of the three-phase alternating current generator is detected, a signal is generated that is in synchronization with the alternating current output voltage of this U phase, and synchronous signals of the other two phases are generated based on this U phase synchronous signal.

As a result, it is possible to detect the alternating current output voltage of any one phase of the three-phase alternating current generator and perform advance angle/delay angle control without having to provide individual magnet position detectors or sub-coils in each phase of the three-phase alternating current generator. Because of this, it is possible to achieve a simplification in the structure, a reduction in size, and a reduction in cost of an alternating current generator.

Moreover, the three-phase voltage generating circuit of the present invention may include: a circuit that generates a rectangular wave signal that is in synchronization with an alternating current output voltage of the U phase; a first triangular wave generating circuit that generates a first triangular wave in synchronization with a phase from 0° to 180° of a rectangular wave that is in synchronization with the U phase; a second triangular wave generating circuit that generates a second triangular wave in synchronization with a phase from 180° to 360° of the rectangular wave that is in synchronization with the U phase; a circuit that generates a V phase rectangular wave in which a level is inverted at a voltage point of two thirds a peak voltage of the first triangular wave, and in which the level is inverted at a voltage point of two thirds a peak voltage of the second triangular wave; and a circuit that generates a W phase rectangular wave in which a level is inverted at a voltage point of one third the peak voltage of the first triangular wave, and in which the level is inverted at a voltage point of one third the peak voltage of the second triangular wave.

In a three-phase voltage generating circuit that is constructed in this manner, when generating a synchronous signal of each phase that is necessary in order to perform advance angle/delay angle control, a rectangular wave is generated that is in synchronization with the alternating current output voltage of any one phase, for example, with the alternating current output voltage of the U phase of the three-phase alternating current generator, and taking this rectangular wave that is in synchronization with the U phase as a reference, rectangular waves that are in synchronization with the other two phases are generated. In this case, a first triangular wave is generated in synchronization with a phase from 0° to 180° of the signal of the U phase rectangular wave, and a second triangular wave is generated in synchronization with a phase from 180° to 360°. In addition, a V phase rectangular wave is generated in which the level is inverted at a voltage point of two thirds the peak voltage of the first triangular wave, and in which the level is inverted at a voltage point of two thirds the peak voltage of the second triangular wave. Moreover, a W phase rectangular wave is generated in which the level is inverted at a voltage point of one third the peak voltage of the first triangular wave, and in which the level is inverted at a voltage point of one third the peak voltage of the second triangular wave.

As a result, it is possible to detect the alternating current output voltage of any one phase of the three-phase alternating current generator and perform advance angle/delay angle control without having to provide individual magnet position detectors or sub-coils in each phase of the three-phase alternating current generator. Because of this, it is possible to achieve a simplification in the structure, a reduction in size, and a reduction in cost of an alternating current generator.

Furthermore, in a battery charging device that is connected between a three-phase alternating current generator and a battery, and is constructed so as to convert alternating current power output from the three-phase alternating current generator into direct current power and supply the direct current power to the battery, and that performs advance angle/delay angle control by either advancing or delaying an energization timing to switching elements of a rectifier portion having a bridge configuration relative to a phase of the alternating current output voltage from the three-phase alternating current generator, determines an advance angle/delay angle amount of the energization timing to the switching elements based on a signal of a differential voltage between a voltage of the battery and a predetermined target voltage, and on synchronous signals of each phase of the alternating current output voltage from the three-phase alternating current generator, a three-phase voltage generation method of the present invention for generating the synchronous signals of the each phase of the alternating current output voltage, the three-phase voltage generation method includes: a step of generating, based on a signal of the alternating current output voltage of any one phase of the three-phase alternating current generator, a signal that is in synchronization with the one phase; and a step of generating synchronous signals of the other two phases based on the synchronous signal of the one phase.

As a result, it is possible to detect the alternating current output voltage of any one phase of the three-phase alternating current generator and perform advance angle/delay angle control without having to provide individual magnet position detectors or sub-coils in each phase of the three-phase alternating current generator. Because of this, it is possible to achieve a simplification in the structure, a reduction in size, and a reduction in cost of an alternating current generator.

Moreover, the three-phase voltage generation method of the present invention may include: a step of generating a rectangular wave signal that is in synchronization with an alternating current output voltage of a U phase; a first triangular wave generation step of generating a first triangular wave in synchronization with a phase from 0° to 180° of a rectangular wave that is in synchronization with the U phase; a second triangular wave generation step of generating a second triangular wave in synchronization with a phase from 180° to 360° of the rectangular wave that is in synchronization with the U phase; a step of generating a V phase rectangular wave in which a level is inverted at a voltage point of two thirds a peak voltage of the first triangular wave, and in which the level is inverted at a voltage point of two thirds a peak voltage of the second triangular wave; and a step of generating a W phase rectangular wave in which a level is inverted at a voltage point of one third the peak voltage of the first triangular wave, and in which the level is inverted at a voltage point of one third the peak voltage of the second triangular wave.

As a result, it is possible to detect the alternating current output voltage of any one phase of the three-phase alternating current generator and perform advance angle/delay angle control without having to provide individual magnet position detectors or sub-coils in each phase of the three-phase alternating current generator. Because of this, it is possible to achieve a simplification in the structure, a reduction in size, and a reduction in cost of an alternating current generator.

A delay angle control method of the present invention in a battery charging device that is connected between a three-phase alternating current generator having U, V, and W phases and a battery, and is constructed so as to convert alternating current power output from the three-phase alternating current generator into direct current power and supply the direct current power to the battery, and that performs advance angle/delay angle control by either advancing or delaying an energization timing to switching elements of a rectifier portion having a bridge configuration relative to a phase of the alternating current output voltage from the three-phase alternating current generator, the delay angle control method includes: an alternating current output voltage detection step of detecting an alternating current output voltage of any one phase of the three-phase alternating current generator; an alternating current output current detection step of detecting an alternating current output current of the any one phase of the three-phase alternating current generator; a U, V, W phase voltage generation step of generating a synchronous signal is generated that is in synchronization with the alternating current output voltage of the one phase that is detected in the alternating current output voltage detection step, and generating synchronous signals of the other two phases based on the synchronous signal of the one phase; a power generation amount calculation step of calculating a power generation amount of the three-phase alternating current generator based on the alternating current output voltage and on the alternating current output current of the one phase of the three-phase alternating current generator; an advance angle/delay angle calculation step of determining an advance angle/delay angle amount of the energization timing to the switching elements based on a signal of a differential voltage between a voltage of the battery and a predetermined target voltage, and on the synchronous signals of the each phase that are output by the U, V, W phase voltage generating circuit; an advance angle/delay angle control step of performing advance angle/delay angle control of the switching elements using the advance angle/delay angle amount determined by the advance angle/delay angle calculation step, and when a delay angle amount exceeds a delay angle limit value in case where delay angle control is performed, performing delay angle control of the switching elements using the delay angle limit value; and a delay angle limit value setting step of storing the delay angle amount and the power generation amount, and comparing a previous delay angle amount and a previous power generation amount with a current delay angle amount and a current power generation amount, and when the current delay angle amount is larger than the previous delay angle amount and the previous power generation amount is larger than the current power generation amount, setting the previous delay angle amount is set as the delay angle limit value.

As a result of the above described steps being performed, when advance angle/delay angle control is performed by generating signals that are in synchronization with the U, V, and W phases based on the alternating current output voltage of any one phase of a three-phase alternating current generator, when the advance angle/delay angle amount is a delay angle amount and also exceeds the delay angle amount limit value (a delay angle amount which is substantially the maximum power generation amount), then the delay angle amount is restricted to the delay angle limit value. Moreover, a power generation amount of the power generator is detected, and the delay angle amount and power generation amount are stored. The previous delay angle amount and the previous power generation amount are then compared with the current delay angle amount and the current power generation amount. If the current delay angle amount is greater than the previous delay angle amount, and also the previous power generation amount is greater than the current power generation amount, then the previous delay angle amount is set as the delay angle limit value.

As a result, in addition to the effect that it is possible to perform advance angle/delay angle control by detecting the alternating current output voltage of any one phase of a three-phase alternating current generator, it is also possible when performing advance angle/delay angle control to automatically set an optimum delay angle limit value irrespective of the alternating current generator, the type of battery, and the size of the displacement.

Effect of the Invention

In the present invention, a sub-coil (an auxiliary coil for detecting alternating current output voltage) is provided in any one phase of a three-phase alternating current generator that has U, V, and W phases, and signals that are in synchronization with the alternating current output voltage of the three phases are generated from the alternating current output voltage of the sub-coil of the one phase. As a result, it is possible to achieve a simplification in the structure, a reduction in size, and a reduction in cost of an alternating current generator without having to provide individual magnet position detectors or sub-coils in each phase of the three-phase alternating current generator.

Furthermore, in the present invention, when performing advance angle/delay angle control by generating signals that are in synchronization with the U, V, and W phases based on the alternating current output voltage of any one phase of a three-phase alternating current generator that has U, V, W phases, the delay angle amount and power generation amount are stored, and when there is a reduction in the power generation amount irrespective of any increase in the delay angle amount, the previous delay angle amount is set as the delay angle limit value. As a result, it is possible to automatically set an optimum delay angle limit value irrespective of the alternating current generator, the type of battery, and the size of the displacement.

Figure 1:
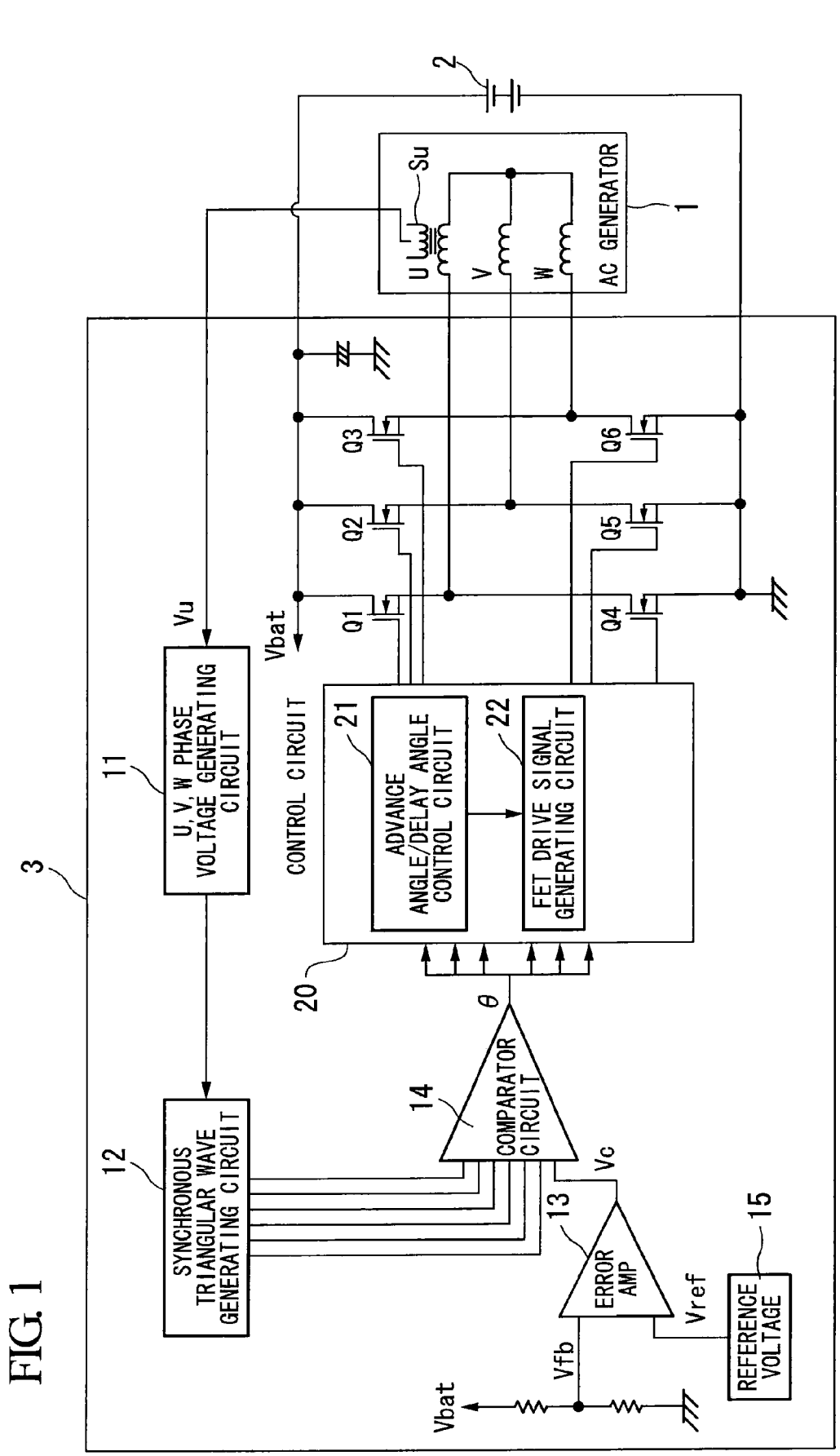
FIG. 1 is a block diagram showing a battery charging device according to a first embodiment of the present invention.

REFERENCE SYMBOLS 1, 1A Permanent magnet type of three-phase alternating current generator
2 Battery
3, 3A, 3B Battery charging device
11 U, V, W phase voltage generating circuit
11A U, V, W phase voltage detection circuit
12 Synchronous triangular wave generating circuit
13 Error amplifier
14 Comparator circuit
20, 20A Control circuit
21 Advance angle/delay angle control circuit
22 FET drive signal generating circuit
23 Power generation amount calculation circuit
24 Delay angle limit value setting circuit
Q1 to Q6 Switching element
Su Sub-coil
CTu Current sensor
Vbat Battery voltage
Vc Error amplifier output
Vfb Feedback signal
θ Advance angle/delay angle amount

BEST MODE FOR CARRYING OUT THE INVENTION

A best mode for carrying out the present invention will now be described with reference to the drawings.

First Embodiment (Description of an Example of the Basic Structure of a First Embodiment of the Battery Charging Device of the Present Invention)

FIG. 1 is a block diagram showing an example of the basic structure of a battery charging device according to a first embodiment of the present invention, and is an example of a battery charging device 3 that performs full-wave rectification on alternating current output voltage from a permanent magnet type of three-phase alternating current generator (referred to below simply as an 'alternating current generator') 1, and charges a battery 2 using this output.

In this battery charging device 3, a full-wave rectification circuit that rectifies three-phase alternating current output from the alternating current generator 1 has a three-phase bridge configuration of N-channel type power MOSFET switching elements Q1 to Q6. The battery charging device 3 controls the battery charge state (or discharge state) by performing delay angle control or advance angle control on the timing of the switching operations of each switching element (the energization timing) to either delay or advance the phase relative to the alternating current output voltage of the alternating current generator 1.

In this battery charging device 3, a U, V, W phase voltage generating circuit 11 is the characteristic portion in the first embodiment of the present invention. The U, V, W phase voltage generating circuit 11 generates signals in synchronization with each of the U phase, the V phase, and the W phase from the alternating current output voltage of a sub-coil Su that is a one phase (the U phase in this example) in the alternating current generator 1.

A detailed description of the structure and operation of this U, V, W phase voltage generating circuit 11 is given below. Firstly, an outline of the overall structure of the battery charging device 3 shown in FIG. 1 will be described.

The sub-coil Su in the three-phase alternating current generator 1 is a sub-coil that detects alternating current output voltage of the U phase. The U, V, W phase voltage generating circuit 11 generates rectangular wave signals that are in synchronization with each phase of the three phases from a voltage waveform (an alternating current waveform) Vu detected by the sub-coil Su, and outputs them to a synchronous triangular wave generating circuit 12.

The synchronous triangular wave generating circuit 12 generates triangular waves from the three phase rectangular wave signals that are output from the U, V, W phase voltage generating circuit 11 such that these triangular waves are in synchronization with these signals. Heights of these triangular waves (the maximum value of the triangular waves) are equal irrespective of the size of the pulse width of the rectangular waves.

An error amplifier 13 compares a feedback signal Vfb from the actual battery voltage Vbat with a set value (a target value) Vref of the battery charging voltage, and then amplifies the signal of the difference between these and outputs it as an error amplifier output Vc. Note that when a battery voltage Vbat is low and Vfb is less than Vref (Vfb<Vref), the error amplifier output Ve is more than 0 (Vc>0), while when the battery voltage Vbat is high and Vfb is more than Vref (Vfb>Vref), the error amplifier output Vc is less than 0 (Vc<0). When Vc is more than 0 (Vc>0), charging to the battery 2 (delay angle control) is performed, while when Vc is less than 0 (Vc<0), discharging from the battery 2 (advance angle control) is performed.

A comparator circuit (an advance angle/delay angle calculation circuit) 14 compares the triangular waves output from the synchronous triangular wave generating circuit 12 with the output Vc from the error amplifier 13, and then decides the switching timings (advance angle/delay angle amounts θ) of the switching elements Q1 through Q6, and outputs signals of the advance angle/delay angle amounts θ to a control circuit 20.

An advance angle/delay angle control circuit 21 in the control circuit 20 receives signals of the energization timings (the advance angle/delay angle amounts θ) from the comparator circuit 14, and then generates ON/OFF signals for the switching elements Q1 through Q6, and outputs these signals to an FET drive signal generating circuit 22. Note that, at this time, the delay angle amount is restricted so that it does not rise above a predetermined delay angle limit value.

The FET drive signal generating circuit 22 receives the ON/OFF signals for the switching elements Q1 through Q6 from the advance angle/delay angle control circuit 21, and generates drive signals (gate drive signals) used to turn the switching elements Q1 through Q6 on or off.

Note that a microcomputer (or microcontroller) is housed within the battery charging device 3, and some of the processing functions of the control circuit 20, the comparator circuit 14, and the other circuits inside the battery charging device 3, which can be executed by software programs, may be carried out by software processes. It is to be understood that these processing functions may be constructed by hardware.

(Description of the U, V, W Phase Voltage Generating Circuit)

Next, the structure and operations of the U, V, W phase voltage generating circuit 11 will be described. In this U, V, W phase voltage generating circuit 11, a rectangular wave signal which is synchronized with one phase (for example the U phase) from among the three phases is taken as a reference, and the positions (phases) of the remaining two phases are detected, and rectangular wave signals are generated for these two phases. In order to achieve this, a triangular wave (a first triangular wave) that is synchronized with the phase from 0° to 180° of the U phase rectangular wave is generated, and in the same way, a triangular wave (a second triangular wave) that is synchronized with the phase from 180° to 360° of the U phase rectangular wave is generated.

Next, rectangular waves are generated in which the level is inverted at the ⅔ voltage point relative to the peak voltage of the triangular waves in each of the first triangular wave and the second triangular wave. The rectangular wave is delayed 120 degrees from the rectangular wave that is in synchronization with the U phase, so that the rectangular wave becomes a rectangular wave that is in synchronization with the V phase.

Moreover, a rectangular wave is generated in which the level is inverted at the ⅓ voltage point relative to the peak voltage of the triangular waves in each of the first triangular wave and the second triangular wave. The rectangular wave is delayed 240 degrees from the rectangular wave that is in synchronization with the U phase, so that the rectangular wave becomes rectangular wave that is in synchronization with the W phase.

Accordingly, because it is possible to generate signals of rectangular waves that are in synchronization with the U phase, the V phase, or the W phase using a single sub-coil, these can be used to control the energization timing, making it possible to achieve both a simplification in the structure of a three-phase alternating current generator and a reduction in the external size thereof, and to achieve a reduction in the cost of an alternating current generator.

Next, a specific example will be described using the drawings.

Figure 2:
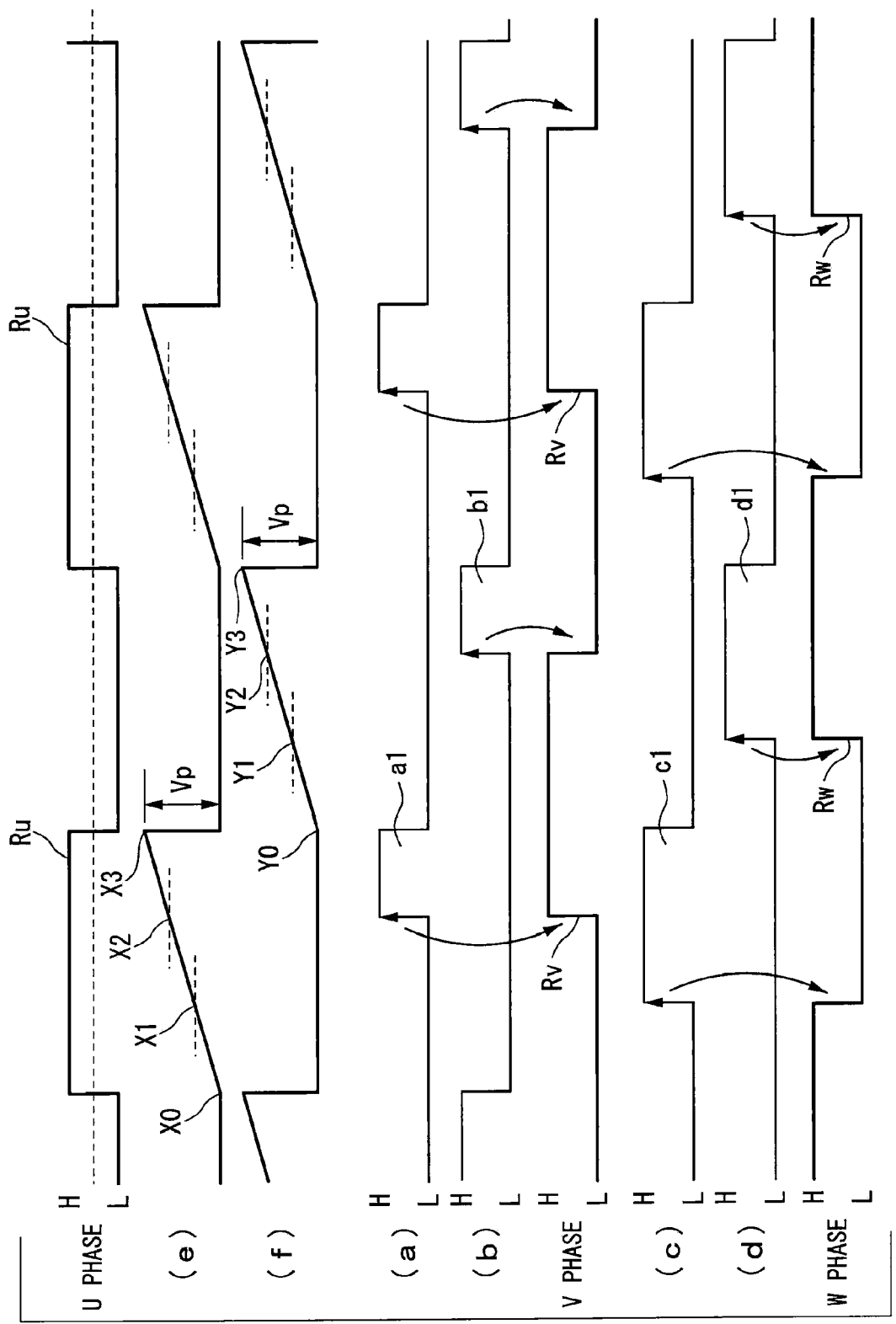
FIG. 2 is a waveform diagram used to illustrate a mechanism for generating a rectangular wave in a U, V, W phase voltage generating circuit of the generator shown in FIG. 1.

FIG. 2 is a view for describing an operation of a U, V, W phase voltage generating circuit, and illustrates a method of generating a V phase rectangular wave Rv and a W phase rectangular wave Rw from a rectangular wave Ru which is synchronized with the U phase. A description of this process is given below with reference to FIG. 2.

(Step 1) Firstly, a rectangular wave Ru which is in synchronization with the U phase is generated from the detected voltage detected by the sub-coil Su. A triangular wave (e) is then generated which is in synchronization with the 'H (high)' side of the rectangular wave Ru.

This triangular wave (e) is in synchronization with the rectangular wave Ru, and the phase width thereof is 180° (0° to 180°). The triangular wave (e) has an equal height (the peak voltage Vp of the triangular wave) irrespective of the size of the pulse width of the rectangular wave Ru. Note that a method of generating triangular waves such that the heights thereof are equal (the peak voltage of the triangular waves) irrespective of the size of the pulse width of the rectangular waves is described below.

(Step 2) In the same way, a triangular wave (f) which is in synchronization with the 'L (low)' side of the rectangular wave Ru is generated. This triangular wave (f) is in synchronization with the rectangular wave Ru, and the phase width thereof is 180° (180° to 360°). The triangular wave (f) also has an equal height (the peak voltage Vp of the triangular wave) irrespective of the size of the pulse width of the rectangular wave Ru.

(Step 3) Next, a point X1 at ⅓rd the height and a point X2 at ⅔rds the height of the peak voltage Vp of the triangular wave (e) is determined. As a result, phase widths of 60° are generated respectively between a point X0 (the rising point of the triangular wave (e)) and the point X1, between the point X1 and the point X2, and between the point X2 and a point X3 (the falling point of the triangular wave (e)). In the same way, a point Y1 at ⅓rd the height and a point Y2 at ⅔rds the height of the peak voltage Vp of the triangular wave (f) is determined.

(Step 4) Next, a pulse a1 which is 'H' from the point X2 to the point X3 is generated, and a pulse b1 which is 'H' from the point Y2 to the point Y3 (the falling point of the triangular waves (f)) is generated.

(Step 5) A rectangular wave Ru is then generated that becomes 'H' at the rising of the pulse a1 and that returns to 'L' at the rising of the pulse b1. This forms a rectangular wave that is in synchronization with the V phase.

(Step 6) Next, a pulse c1 which is 'H' from the point X1 to the point X3 is generated, and a pulse d1 which is 'H' from the point Y1 to the point Y3 is generated.

(Step 7) A rectangular wave Rw is then generated that becomes 'H' at the rising of the pulse d1 and that returns to 0 at the rising of the pulse c1. This forms a rectangular wave that is in synchronization with the W phase.

By performing the above described processing, it is possible to generate the rectangular wave Rv of the V phase whose phase is delayed by 120° relative to the U phase, and the rectangular wave Rw of the W phase whose phase is delayed by 240° relative to the U phase.

Figure 3A:
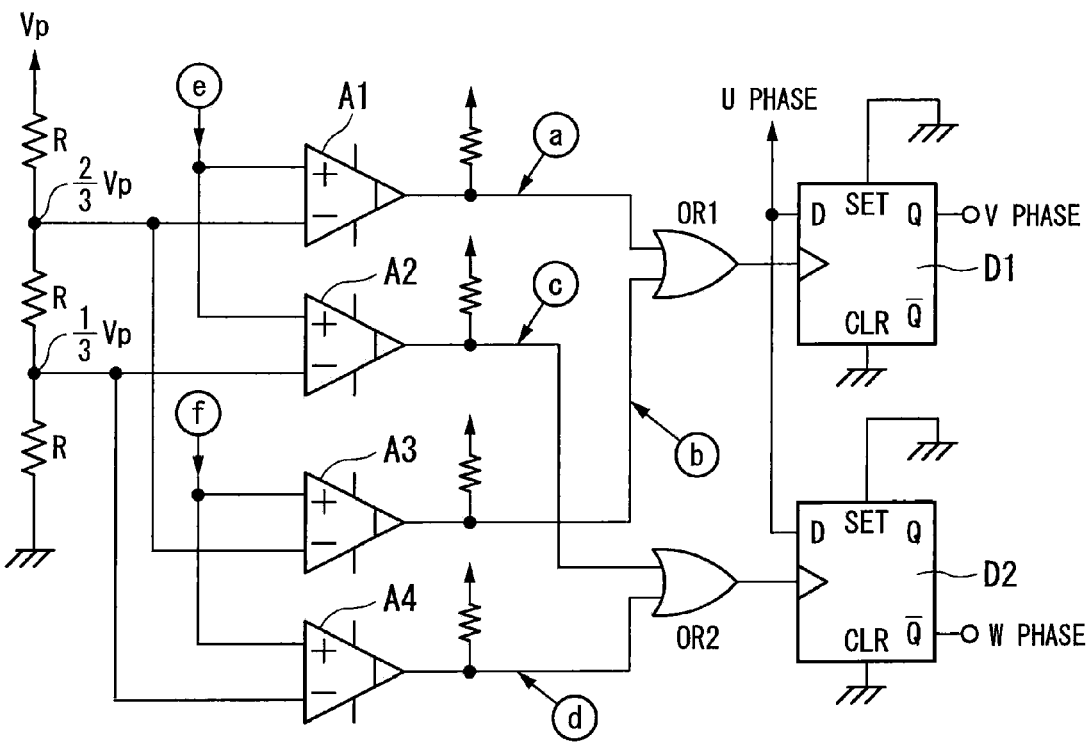
FIG. 3A is a circuit diagram showing the structure of the U, V, W phase voltage generating circuit shown in FIG. 1.
Figure 3B:
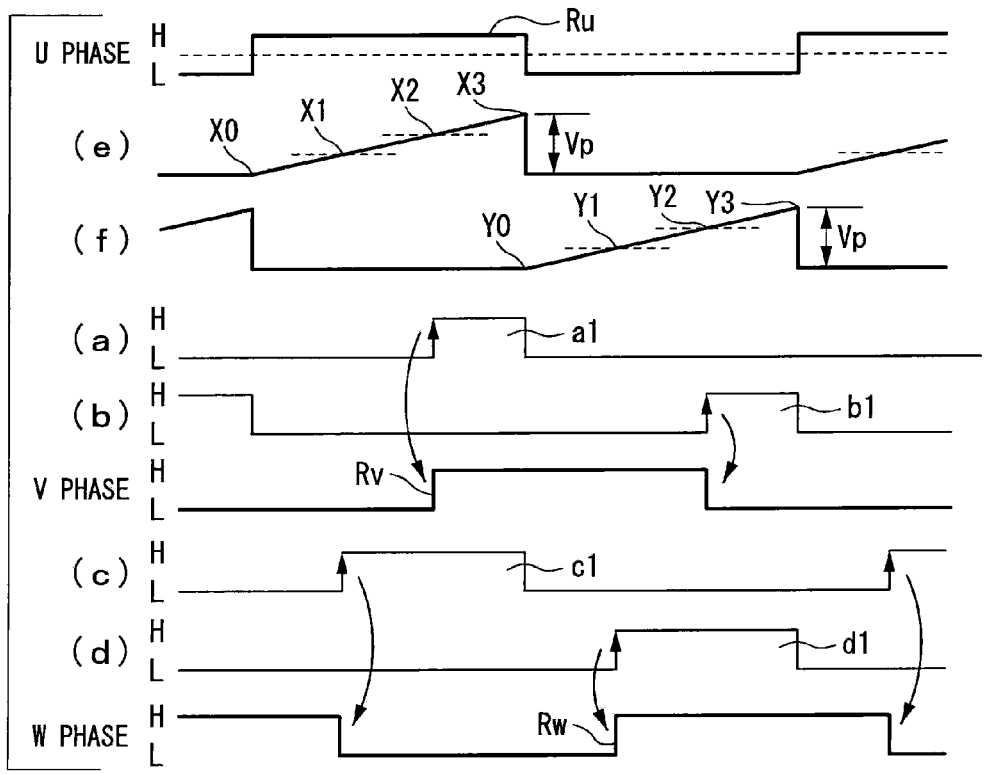
FIG. 3B is a waveform diagram showing an operation of the U, V, W phase voltage generating circuit shown in FIG. 3A.

FIG. 3A shows a structural example of a circuit that generates V phase and W phase rectangular waves from the U phase rectangular wave and the triangular waves (e) and (f) that are in synchronization with the U phase. Operations of this circuit are described below with reference to FIG. 3B.

The peak voltage Vp of the triangular wave is divided by three resistors R that are connected in series. The voltage of (⅓)×Vp is input as a reference voltage into the (−) input terminals of comparators A2 and A4, and the voltage of (⅔)× Vp is input as a reference voltage into the (−) input terminals of comparators A1 and A3. The triangular wave (e) is input into the (+) input terminals of the comparators A1 and A2, while the triangular wave (f) is input into the (+) input terminals of the comparators A3 and A4.

Accordingly, the output from the comparator A1 is 'H' from the point X2 to the point X3, and forms the pulse a1. The output from the comparator A2 is 'H' from the point X1 to the point X3, and forms the pulse c1. The output from the comparator A3 is 'H' from the point Y2 to the point Y3, and forms the pulse b1. The output from the comparator A4 is 'H' from the point Y1 to the point Y3, and forms the pulse d1.

Outputs from the comparators A1 and A3 form an input to the clock terminal of a D flip-flop D1 via an OR circuit OR1. Outputs from the comparators A2 and A4 form an input to the clock terminal of a D flip-flop D2 via an OR circuit OR2.

Accordingly, the rising edge of the output from the comparator A1 (the pulse a1) forms the input to the clock terminal of the D flip-flop D1. At this time, because the level of the U phase which forms the D input is 'H', an output Q from the D flip-flop D1 is 'H'.

The rising edge of the output from the comparator A3 (the pulse b1) also forms the input to the clock terminal of the D flip-flop D1. At this time, because the level of the U phase which forms the D input is 'L', the output Q is 'L'. Accordingly, the output Q from the D flip-flop D1 is 'H' from the rising edge of the pulse a1 to the rising edge of the pulse b1, and the V phase rectangular wave Rv is obtained.

The rising edge of the output from the comparator A2 (the pulse c1) forms the input to the clock terminal of the D flip-flop D2. At this time, because the level of the U phase which forms the D input is 'H', an output Q from the D flip-flop D2 is 'H' and an inverted output (Q bar) of the output Q is 'L'.

The rising edge of the output from the comparator A4 (the pulse d1) also forms the input to the clock terminal of the D flip-flop D2. At this time, because the level of the U phase which forms the D input is 'L', the output Q is 'L', and an inverted output (Q bar) of the output Q is 'H'. Accordingly, the inverted output (Q bar) from the D flip-flop D2 is 'H' from the rising edge of the pulse d1 to the rising edge of the pulse c1, and the W phase rectangular wave Rw is obtained.

By using the above described circuit, the alternating current output voltage from the alternating current generator 1 is detected by the U phase sub-coil Su of the alternating current generator 1, and with the rectangular wave that is in synchronization with the alternating current output voltage of this U phase taken as a reference, it is possible to generate rectangular waves that are in synchronization with the other two phases. Note that it is also possible to provide a sub-coil in the V phase of the alternating current generator 1 and, taking the rectangular wave that is in synchronization with the alternating current output voltage from this V phase as a reference, to generate rectangular waves that are in synchronization with the other two phases. In the same way, it is also possible to provide a sub-coil in the W phase of the alternating current generator 1 and, taking the rectangular wave that is in synchronization with the alternating current output voltage from this V phase as a reference, to generate rectangular waves that are in synchronization with the other two phases.

(Description of a Method of Generating Triangular Wave Voltage in a U, V, W Phase Voltage Generating Circuit)

As is described above, in the U, V, W phase voltage generating circuit 11, when V phase and W phase rectangular waves are being generated from a rectangular wave that is in synchronization with the U phase, it is necessary to generate triangular waves which have a uniform height (a uniform peak voltage of the triangular waves) irrespective of the size of the pulse width of the U phase rectangular wave. Here, a description will be given with reference to FIG. 4 and FIG. 5 of an example of a mechanism for generating a triangular wave having a uniform peak voltage which is in synchronization with the rectangular wave Ru. Note that the mechanism for generating triangular waves that is described here is the same as the method used to generate triangular waves in the synchronous triangular wave generating circuit 12 shown in FIG. 1.

Generally, because the frequency of the alternating current voltage output by an alternating current generator does not change abruptly, it can be considered that the waveform of the previous cycle and the waveform of the current cycle are substantially the same. For example, in FIG. 4, if the waveform 2 is the waveform of the current cycle, then it can be seen that a half cycle T2 of the waveform 2 and a half cycle T1 of a waveform 1 of the previous cycle are substantially the same.

Using this characteristic, a triangular wave voltage VB is generated by the following process.

Figure 4:
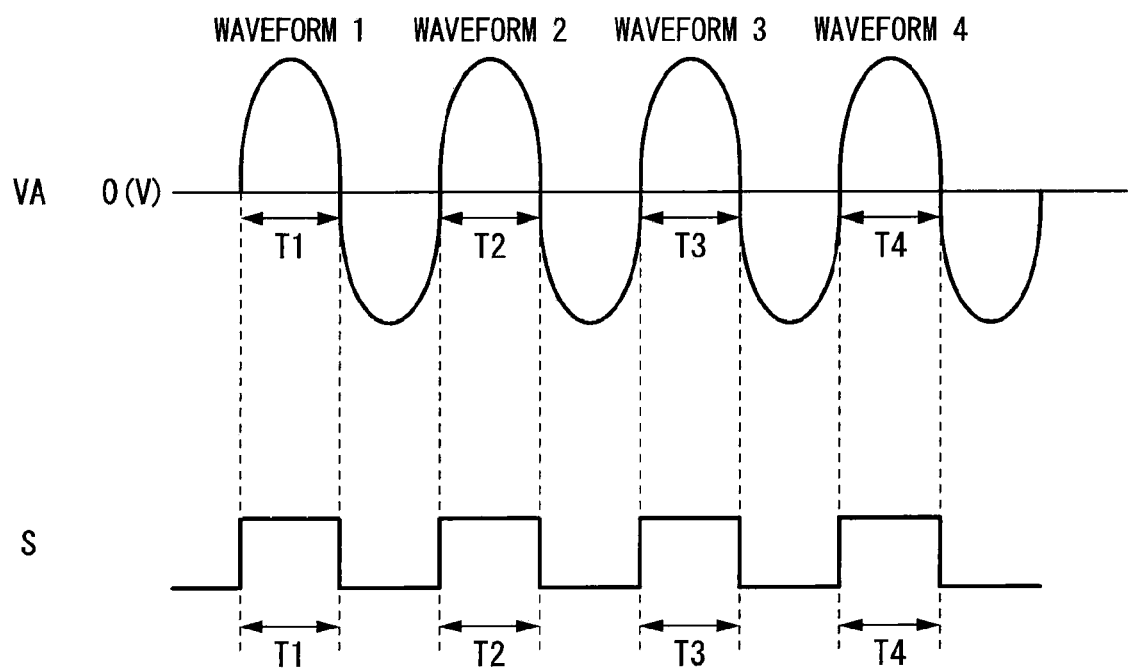
FIG. 4 is a waveform diagram showing a rectangular wave that is in synchronization with the alternating current voltage waveform of the U phase of the generator shown in FIG. 1.

(Step 1) As is shown in FIG. 4, in the cycle of the waveform 1, a rectangular wave S is generated from an alternating current voltage VA output by an alternating current generator. A half cycle of the rectangular wave S that corresponds to this waveform 1 matches the half cycle T1 of the alternating current voltage VA of the cycle of the waveform 1.

(Step 2) Next, the time of the half cycle T1 of the rectangular wave S is counted.

(Step 3) Next, the count number of the time of the half cycle T1 is divided by a predetermined resolution n so as to obtain a time t1 (=T1/n). Here, the resolution n is an amount that prescribes the smoothness of the slope of the triangular wave voltage VB, and the higher the resolution n, the smoother the slope of the triangular wave voltage VB.

(Step 4) Next, the peak voltage Vp of the triangular wave voltage VB is divided by the predetermined resolution n, so as to obtain a voltage v1 (=Vp/n).

Figure 5:
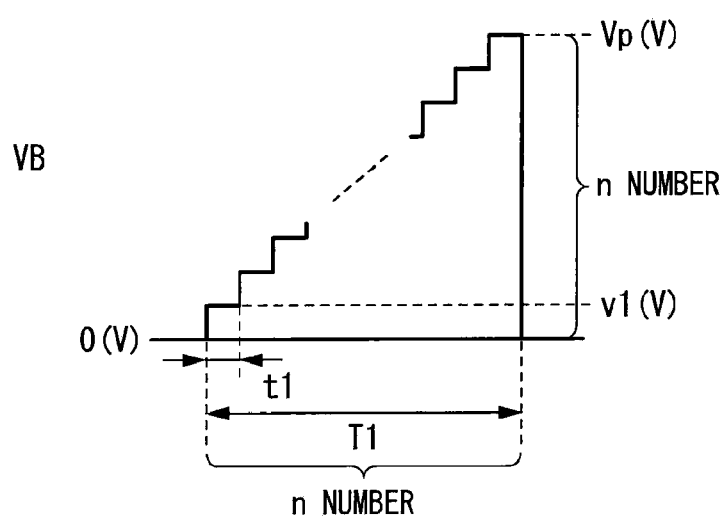
FIG. 5 is a graph used to illustrate a mechanism for generating a triangular wave in an embodiment of the present invention.

(Step 5) Next, as is shown in FIG. 5, at the timing of the rising of the waveform 2 of the next cycle (the timing when the counting of T2 is started), the triangular wave voltage VB is raised by the voltage v1, and this triangular wave voltage VB is maintained for the period of the aforementioned time t1.

(Step 6) In the cycle of the same waveform 2, at the timing when the time t1 has elapsed, the triangular wave voltage VB is further raised by the voltage v1, and this is repeated in total for n number of times. As a result, a stepped waveform such as that shown in FIG. 5 is obtained, and a stepped waveform is obtained that corresponds to the slope portion of the triangular wave voltage that corresponds to the cycle of the waveform 2 is obtained. If the value of the resolution n is increased, the stepped waveform becomes smooth, and a superior triangular wave can be obtained.

By performing the above processing, using the waveform of the alternating current voltage VA of the previous cycle, a triangular wave is generated which is the triangular wave voltage corresponds to each cycle of the alternating current voltage VA, and in which the peak voltage Vp is uniform.

(Description of the Energization Timing to the Switching Elements in the Advance Angle/Delay Angle Control)

In the battery charging device 3 of the present invention, alternating current output voltage is detected by the U phase sub-coil Su of the alternating current power generator 1 and, based on the rectangular wave that is in synchronization with this U phase, rectangular waves that are in synchronization with the other two phases are generated by the U, V, W phase voltage generating circuit 11. In the synchronous triangular wave generating circuit 12, triangular waves that are in synchronization with each phase are generated based on the rectangular waves output from the U, V, W phase voltage generating circuit 11.

The energization timings (the advance angle/delay amounts θ) for the switching elements Q1 through Q6 are determined by the comparator circuit 14 based on the triangular waves output from the synchronous triangular wave generating circuit 12 and on the error amplifier output Vc which is output from the error amplifier 13, and advance angle/delay angle control is performed. A method of determining these energization timings (the advance angle/delay amounts θ) is described below.

Figure 6A:
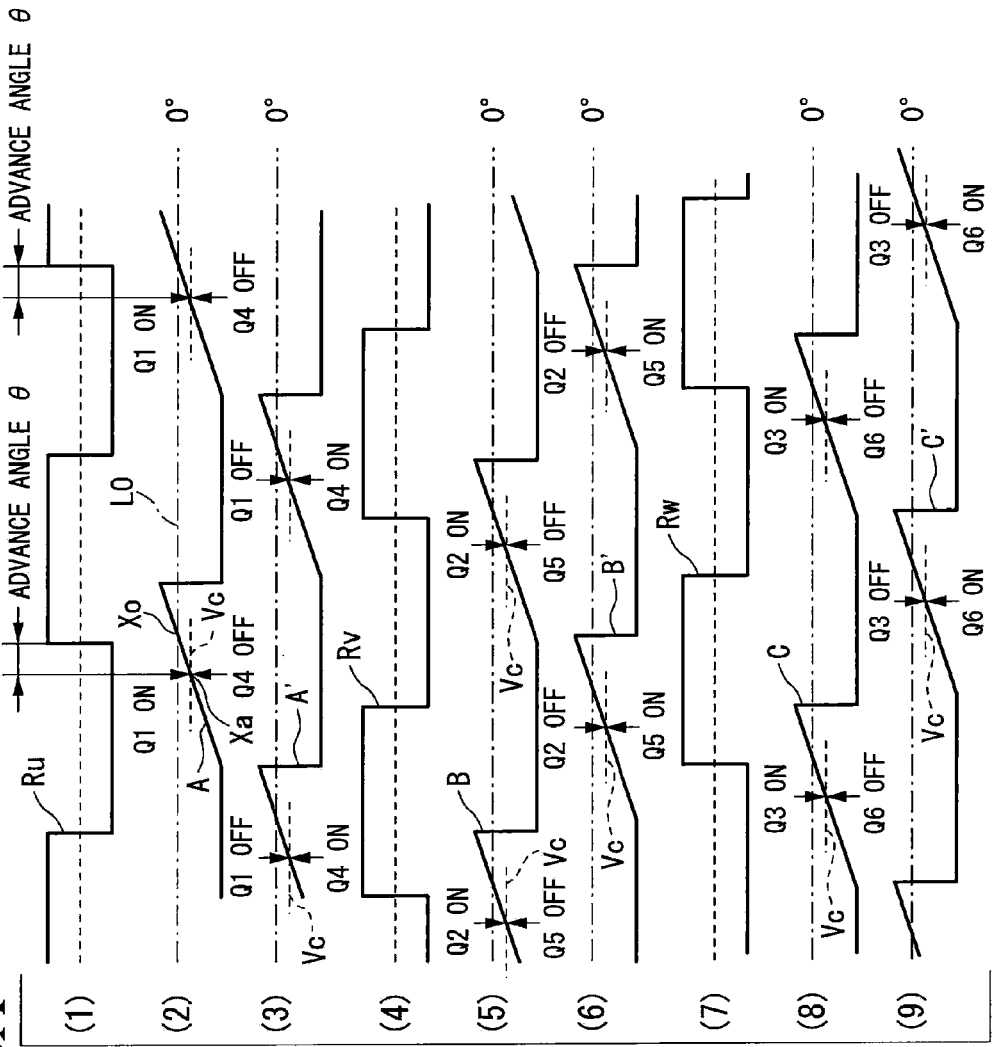
FIG. 6A is a waveform diagram showing an advance angle control energization timing in the embodiment of the present invention.
Figure 7A:
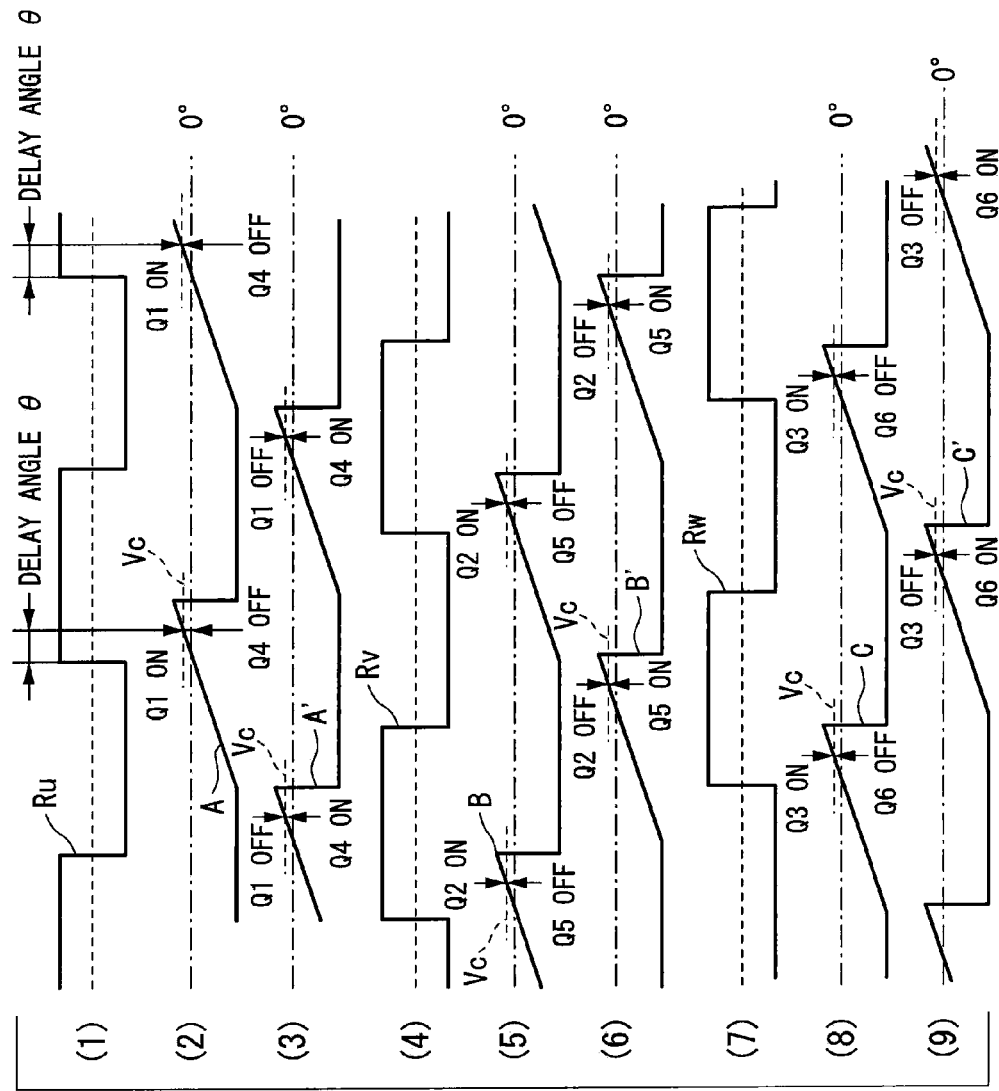
FIG. 7A is a waveform diagram showing a delay angle control energization timing in the embodiment of the present invention.

FIG. 6A and FIG. 7A are views illustrating energization timings in the advance angle/delay angle control of switching elements. FIG. 6A shows an advance angle control state (a battery discharging state) when the battery voltage Vbat is high and Vfb is more than Vref and Vc is less than 0 (Vfb>Vref, Vc<0). FIG. 7A shows a delay angle control state (a battery charging state) when the battery voltage Vbat is low and Vfb is less than Vref and Vc is more than 0 (Vfb<Vref, Vc>0).

In FIG. 6A which shows advance angle control timings (0° to 120° (180° energization)), the waveform (1) in FIG. 6A shows the rectangular wave Ru that is in synchronization with the detected voltage of the U phase sub-coil Su, and is a signal that is output from the U, V, W phase voltage generating circuit 11.

The waveform (2) in FIG. 6A shows a triangular wave A that is generated in synchronization with the W phase rectangular wave Rw, and is a signal that is output from the synchronous triangular wave generating circuit 12. The waveform (3) in FIG. 6A shows a triangular wave A' that is obtained by phase shifting the triangular wave by A 180°, and is a signal that is output from the synchronous triangular wave generating circuit 12.

The waveform (4) in FIG. 6A shows a rectangular wave Rv that is in synchronization with the V phase, and is a signal that is output from the U, V, W phase voltage generating circuit 11.

The waveform (5) in FIG. 6A shows a triangular wave B that is generated in synchronization with the U phase rectangular wave Ru, and is a signal that is output from the synchronous triangular wave generating circuit 12. The waveform (6) in FIG. 6A shows a triangular wave B' that is obtained by phase shifting the triangular wave B by 180°, and is a signal that is output from the synchronous triangular wave generating circuit 12.

The waveform (7) in FIG. 6A shows a rectangular wave Rw that is in synchronization with the W phase, and is a signal that is output from the U, V, W phase voltage generating circuit 11.

The waveform (8) in FIG. 6A shows a triangular wave C that is generated in synchronization with the V phase rectangular wave Rv, and is a signal that is output from the synchronous triangular wave generating circuit 12. The waveform (9) in FIG. 6A shows a triangular wave C' that is obtained by phase shifting the triangular wave C by 180°, and is a signal that is output from the synchronous triangular wave generating circuit 12.

The above described triangular waves A, A', B, B', C, C' are input into the comparator circuit 14, and are compared in the comparator circuit 14 respectively with the error amplifier output Vc.

Figure 6B:
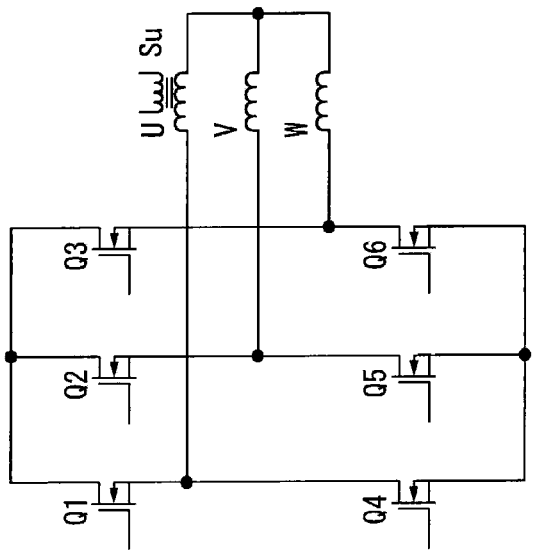
FIG. 6B is a circuit diagram showing a generator and switching elements that are controlled at the advance angle control energization timing shown in FIG. 6A.

In the waveform (2) in FIG. 6A, the triangular wave A that is generated from the W phase rectangular wave Rw is used in order to decide the energization timings (the advance angle/delay angle amounts θ) of the U phase switching element Q1 and Q4 which are shown in FIG. 6B. The reason for this is that, taking an intersection point X0 between the triangular wave A and a line shown by the single dot-chain line (a line where the advance angle is 0°) as a reference, advance angle/delay angle control is performed within ranges of an advance angle of 0° to 120° and a delay angle of 0° to 60°. For example, if the triangular wave C that is generated from the U phase rectangular wave Ru is used as the triangular wave, then the control range is offset towards the advance angle side, while if the triangular wave C' is used, the control range is offset towards the delay angle side, and thus, advance angle/delay angle control cannot be performed within appropriate ranges of such as an advance angle of 0° to 120° and a delay angle of 0° to 60°.

In this manner, the triangular wave A that is generated in synchronization with the W phase rectangular wave Rw is compared with the error amplifier output Vc. Namely, the ON timings of the switching element Q1 on the upper side of the U phase and the OFF timings of the switching element Q4 on the lower side of the U phase are decided by the intersection points Xa between the triangular wave A and the error amplifier output Vc. Moreover, the advance angle/delay amounts θ of the U phase are also decided by this.

In this example, the battery charging voltage is higher than the reference voltage and the error amplifier output Vc is less than 0 (Vc<0), and Vc is lower than the line L0 (the line at the level where Vc=0) where the advance angle/delay angle amount is 0°, which is shown by the single dot chain line, and the intersection point Xa between the triangular wave A and Vc comes before the intersection point X0 between the triangular wave A and the line L0, and thus advance angle control is performed.

In the same way, the OFF timings of the switching element Q1 and the ON timings of the switching element Q4 are decided by the intersection points between the triangular wave A' and the error amplifier output Vc.

Note that in the waveforms (2) and (3) in FIG. 6A, the ON timings of the switching elements Q1 and Q4 are set so as to be slightly delayed relative to the OFF timings of Q1 and Q4. This is because, in order to avoid switching ON the upper and lower switching elements Q1 and Q4 at the same time, the ON timings are delayed slightly from the OFF timings so that a dead time (a delay time that is determined in accordance with the ON/OFF time characteristics of the FET elements) is set.

As has been described above, in the U phase it is possible to decide the ON/OFF timings (the advance angle/delay angle amounts θ) of the switching elements Q1 and Q4 by comparing the triangular waves A and A' which are generated based on the rectangular wave Rw that is in synchronization with the W phase with the error amplifier output Vc. In addition, the control range of the advance angle is 0° to 120°, and the range of the delay angle is 0° to 60°.

In the same way, in the V phase it is possible to decide the ON/OFF timings (the advance angle/delay amounts θ) of the switching elements Q2 and Q5 by comparing the triangular waves B and B' which are generated based on the rectangular wave Ru that is in synchronization with the U phase, with the error amplifier output Vc. In addition, the control range of the advance angle is 0° to 120°, and the range of the delay angle is 0° to 60°.

In the same way, in the W phase it is possible to decide the ON/OFF timings (the advance angle/delay amounts θ) of the switching elements Q3 and Q6 by comparing the triangular waves C and C' which are generated based on the rectangular wave Rv that is in synchronization with the V phase, with the error amplifier output Vc. In addition, the control range of the advance angle is 0° to 120°, and the range of the delay angle is 0° to 60°.

FIG. 7A which shows delay angle control timings (0° to 120° (180° energization)) shows an operation in a delay angel control state (Vc>0) in place of the advance angle control state (Vc<0) shown in FIG. 6A.

Figure 7B:
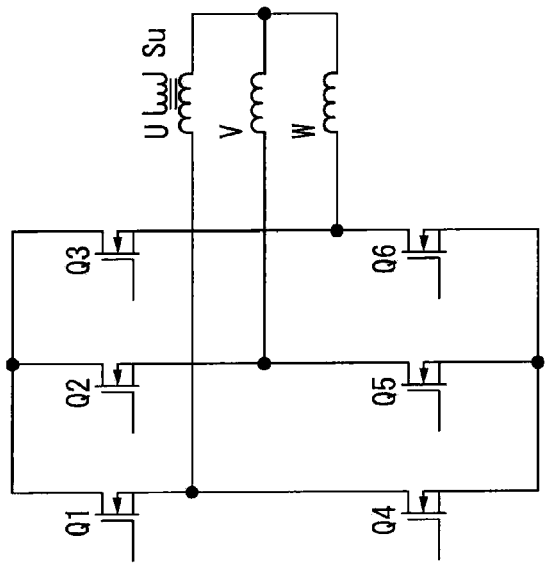
FIG. 7B is a circuit diagram showing the generator and the switching elements that are controlled at the delay angle control energization timing shown in FIG. 7A.

In the same way as in FIG. 6A, the waveform (1) in FIG. 7A shows the rectangular wave Ru that is in synchronization with the detected voltage of the U phase sub-coil Su shown in FIG. 7B, the waveform (2) in FIG. 7A shows the triangular wave A that is generated in synchronization with the W phase rectangular wave Rw, and the waveform (3) in FIG. 7A shows the triangular wave A' that is obtained by phase shifting the triangular wave A by 180°.

The waveform (4) in FIG. 7A shows the rectangular wave Rv that is in synchronization with the V phase, the waveform (5) in FIG. 7A shows the triangular wave B that is generated in synchronization with the U phase rectangular wave Ru, and the waveform (6) in FIG. 7A shows the triangular wave B' that is obtained by phase shifting the triangular wave B by 180°.

The waveform (7) in FIG. 7A shows the rectangular wave Rw that is in synchronization with the W phase, the waveform (8) in FIG. 7A shows the triangular wave C that is generated in synchronization with the V phase rectangular wave Rv, and the waveform (9) in FIG. 7A shows the triangular wave C' that is obtained by phase shifting the triangular wave C by 180°.

The above described rectangular waves Ru, Rv, and Rw are output from the U, V, W phase voltage generating circuit 11, while the triangular waves A, A', B, B', C, C' are output from the synchronous triangular wave voltage circuit 12. The triangular waves A, A', B, B', C, C' are input into the comparator circuit 14, and are compared respectively with the error amplifier output Vc.

Note that the operation shown in FIG. 7A is the case where the advance angle control state shown in FIG. 6A (Vc<0) is simply changed to a delay angle control state (Vc>0), and thus, the basic operations are the same. Accordingly, a description of these basic operations is omitted here.

Second Embodiment (Description of an Example of the Basic Structure of a Second Embodiment of the Battery Charging Device of the Present Invention)

In the first embodiment, an example is described in which a sub-coil (an auxiliary coil for detecting alternating current output voltage) is provided in any one phase of a three-phase alternating current generator, and signals that are in synchronization with the alternating current output voltage of the three phases is generated from the alternating current output voltage of the sub-coil of the one phase. Advance angle/delay angle control is then performed based on these synchronized signals.

In the second embodiment of the present invention, an example is described in which, in addition to the basic structure of the first embodiment, when delay angle control is performed, the delay angle is controlled such that it does not increase to more than the delay angle amount that causes the maximum amount of power to be generated by the alternating current generator (to more than the delay angle limit value), and in which the optimum delay angle limit value is set automatically irrespective of the alternating current generator, the battery type, and the size of the engine (the displacement).

Figure 8:
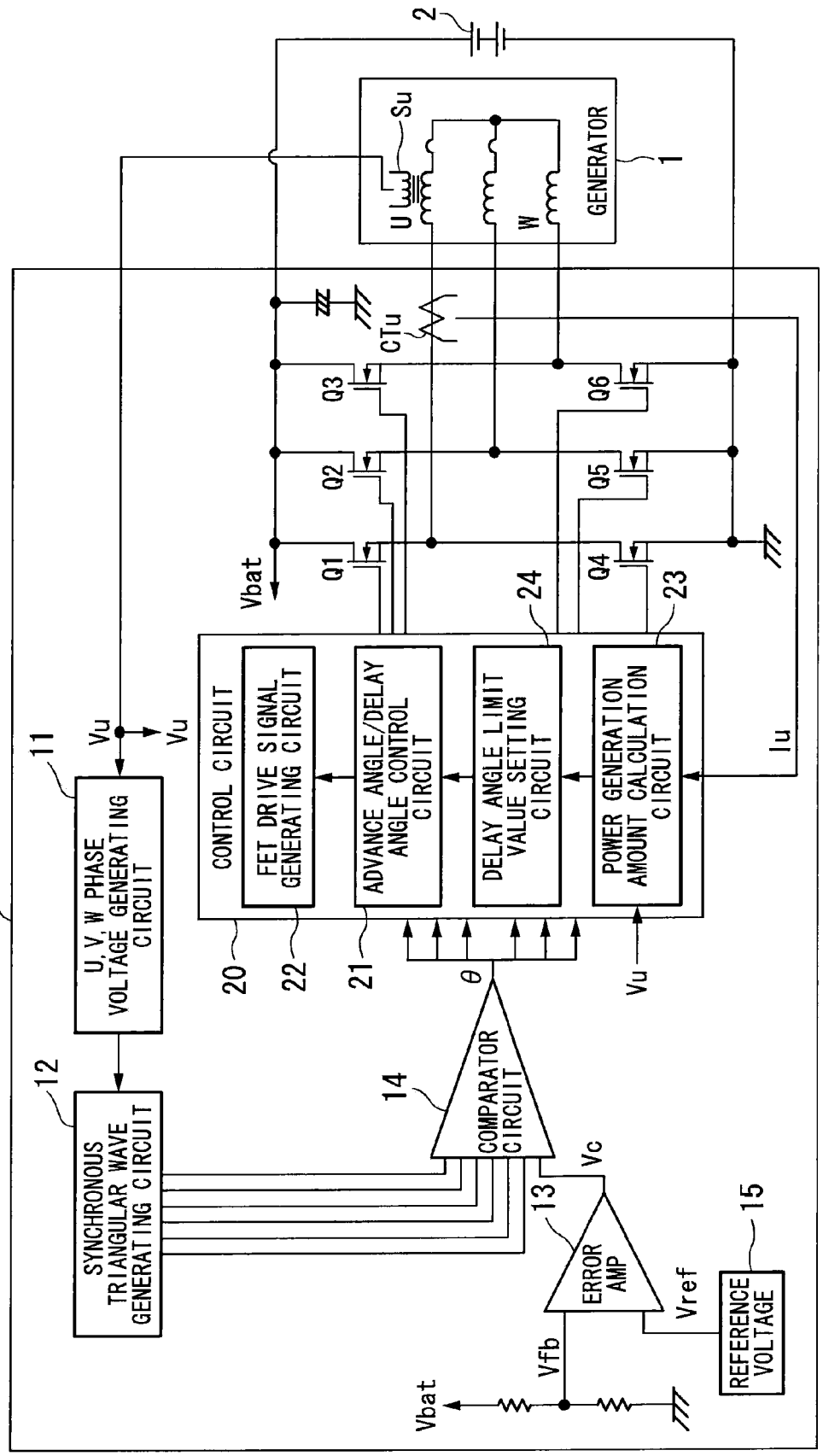
FIG. 8 is a block diagram showing a battery charging device according to a second embodiment of the present invention.

FIG. 8 is a block diagram showing an example of the basic structure of a battery charging device according to a second embodiment of the present invention. In comparison to the circuit of the first embodiment shown in FIG. 1, the circuit shown in FIG. 8 has a power generation amount calculation circuit 23 and a delay angle limit value setting circuit 24 additionally provided in the control circuit 20. Moreover, a current sensor CTu (for example, a hole element or the like) is also added for detecting U phase current in the alternating current generator 1. The power generation amount calculation circuit 23, delay angle limit value setting circuit 24, and current sensor CTu are used to automatically set an optimum delay angle limit value.

The power generation amount calculation circuit 23 is input a signal Vu of the alternating current output voltage of the alternating current generator 1 from the sub-coil Su, and also is input a signal Iu of the current of the U phase of the alternating current generator 1 from the current sensor CTu, and performs processing to calculate the amount of power generated by the alternating current generator 1.

The delay angle limit value setting circuit 24 performs processing to set a delay angle limit values based on an advance angle/delay angle amount θ that is input from the comparator circuit 14, and on the power generation amount determined by the power generation amount calculation circuit 23. The content of this processing is described below in detail.

The structure and operation of the circuit shown in FIG. 8 are fundamentally the same as those of the circuit shown in FIG. 1 other than the fact that the power generation amount calculation circuit 23 and the delay angle limit value setting circuit 24 are additionally provided in the control circuit 20.

Namely, in the U, V, W phase voltage generating circuit 11, a signal of a rectangular wave that is in synchronization with the U phase is generated based on a signal Vu of the alternating current output voltage of the U phase that is detected by the sub-coil Su, and signals of rectangular waves that are in synchronization with the other two phases are also generated. The synchronous triangular wave generating circuit 12 generates triangular waves that are in synchronization with the rectangular waves that are output from the U, V, W phase voltage generating circuit 11.

In the comparator circuit 14, the energization timings (the advance angle/delay amounts θ) for the switching elements Q1 through Q6 are determined based on the triangular waves output from the synchronous triangular wave generating circuit 12 and on the error amplifier output Vc which is output from the error amplifier 13. The advance angle/delay angle control circuit 21 sends signals of the advance angle/delay angle amounts θ that are input from the comparator circuit 14 to the FET drive signal generating circuit 22. At this time, the delay angle amount is restricted so that it does not rise above a predetermined delay angle limit value set by the delay angle limit value setting circuit 24.

The method of controlling the energization timings of the switching elements is the same as in the first embodiment. FIG. 6 shows an advance angle control state (a battery discharging state) when the battery voltage Vbat is high, and Vfb is more than Vref and Vc is less than 0 (Vfb>Vref, Vc<0). FIG. 7 shows a delay angle control state (a battery charging state) when the battery voltage Vbat is low, and Vfb is less than Vref and Vc is more than 0 (Vfb<Vref, Vc>0).

(Description of the Delay Angle Limit Setting Process of the Second Embodiment)

As has been described above, the second embodiment has the characteristics that delay angle limit values are automatically set by the delay angle limit value setting circuit 24.

Figure 9:
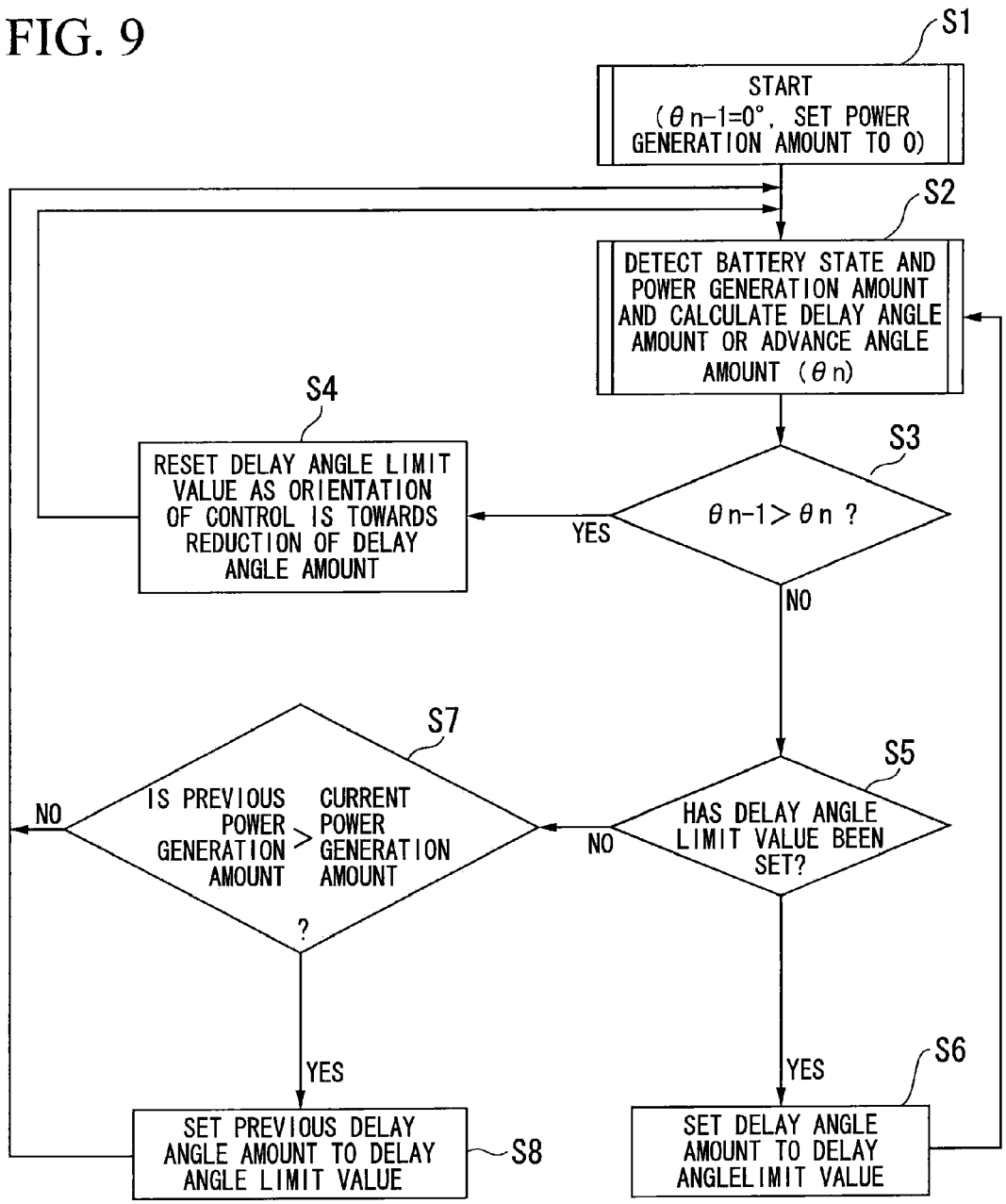
FIG. 9 is a flowchart showing a setting process to set a delay angle limit value in an embodiment of the present invention.

FIG. 9 is a flow chart showing a process to set a delay angle limit value in the delay angle limit value setting circuit 24, and the process to set a delay angle limit value is described below with reference to FIG. 9.

Firstly, the advance angle/delay angle amount θn−1 and the power generation amount which are variables are set to 0 (zero) (step S1). Next, the battery charging state and the power generation amount of the alternating current generator are detected. In addition, the current advance angle/delay angle amount θn is detected and these are stored (step S2).

Next, the previous advance angle/delay angle amount θn−1 which has been stored as a variable is compared with the current advance angle/delay angle amount θn (step S3). If there is a delay angle control state and θn−1 is more than θn (θn−1>θn), the orientation of the control is in the direction in which there is a reduction in the delay angle amount, and thus, when the delay angle limit value is set, this setting is terminated (reset) (step S4), and the routine returns to step S2.

In step S3, if there is in a delay angle control state and θn is more than θn−1 (θn>θn−1), the orientation of the control is in the direction in which there is an increase in the delay angle amount, and thus, the routine moves to step S5 where a determination is made as to whether or not a delay angle limit value has already been set.

In step S5, if it is determined that a delay angle limit value has already been set, the delay angle amount is set to the delay angle limit value (step S6), and the routine returns to step S2.

In the delay angle control, the delay angle amount is controlled such that it does not exceed the delay angle limit value. Note that this delay angle limit value is maintained until the control direction is oriented in a direction in which there is a decrease in the delay angle amount (for example, until the battery charging voltage rises).

In step S5, if it is determined that a delay angle limit value has not been set, the routine moves to step S7 and a determination is made as to whether or not the previous power generation amount is more than the current power generation amount (step S7).

If it is determined in step S7 that the previous power generation amount is more than the current power generation amount, the delay angle amount for the previous power generation amount is set to the delay angle limit value (step S8). This is because, as in FIG. 10 which shows the method of setting a delay angle limit value, when the current power generation amount Pn is smaller than the previous power generation amount Pn−1 irrespective of the increase in the delay angle amount, it is supposed that there is a point where the power generation amount is at maximum in a space $\theta_A$ between Pn−1 and Pn, and therefore, the delay angle amount $\theta$n−1 for the previous power generation amount Pn−1 is set to the delay angle limit value.

Moreover, if it is determined in step S7 that the previous power generation amount is less than the current power generation amount, the routine returns to step S2 without the delay angle limit value being set.

Figure 10:
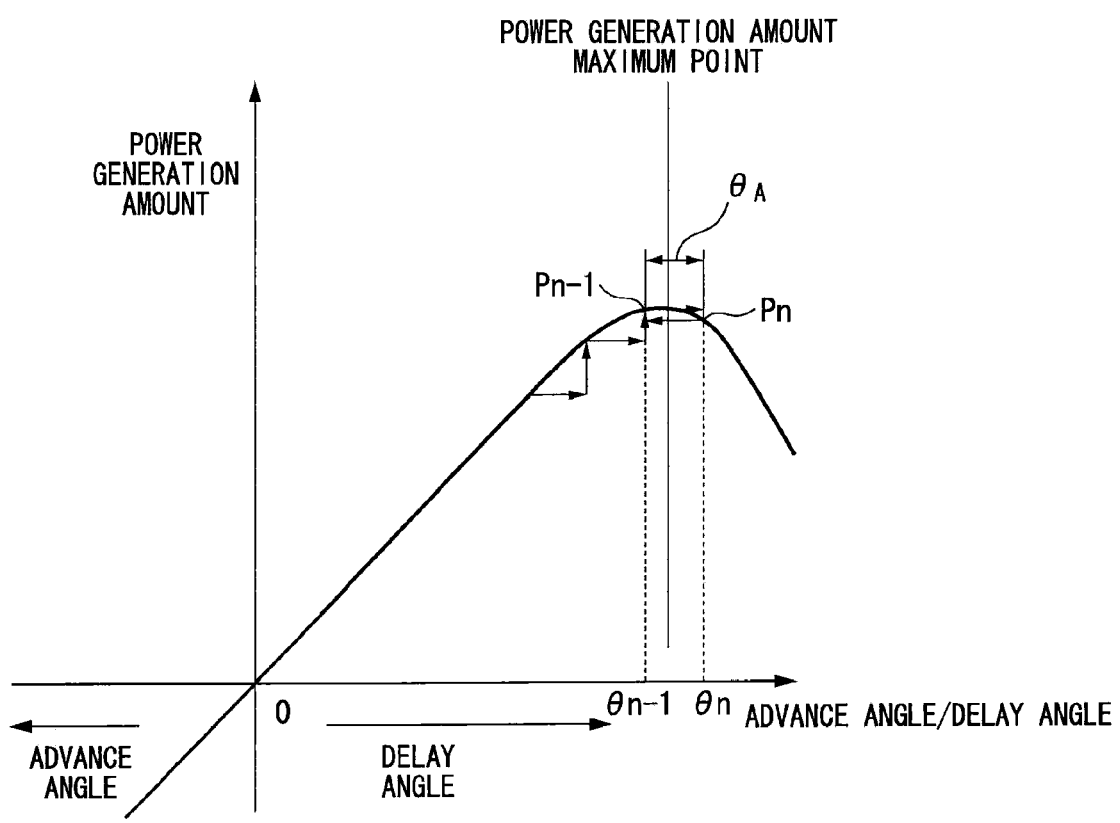
FIG. 10 is a view showing a method of setting a delay angle limit value in the embodiment of the present invention.
Figure 11:
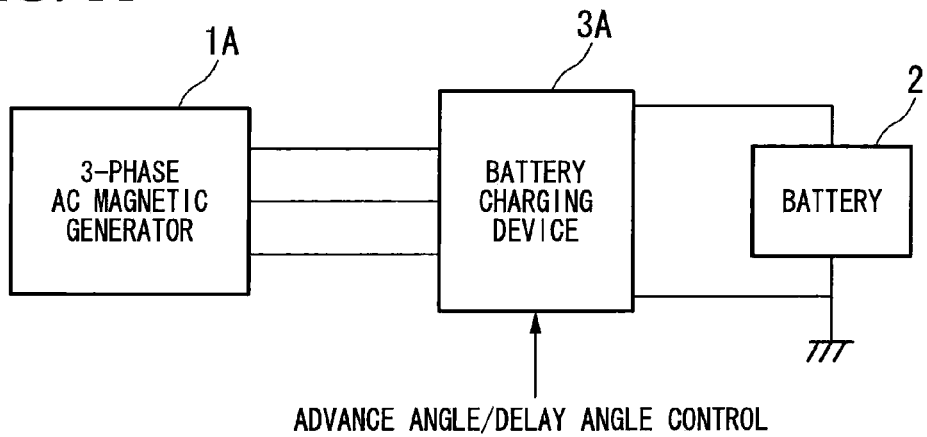
FIG. 11 is a block diagram used to illustrate a battery charging device.
Figure 12:
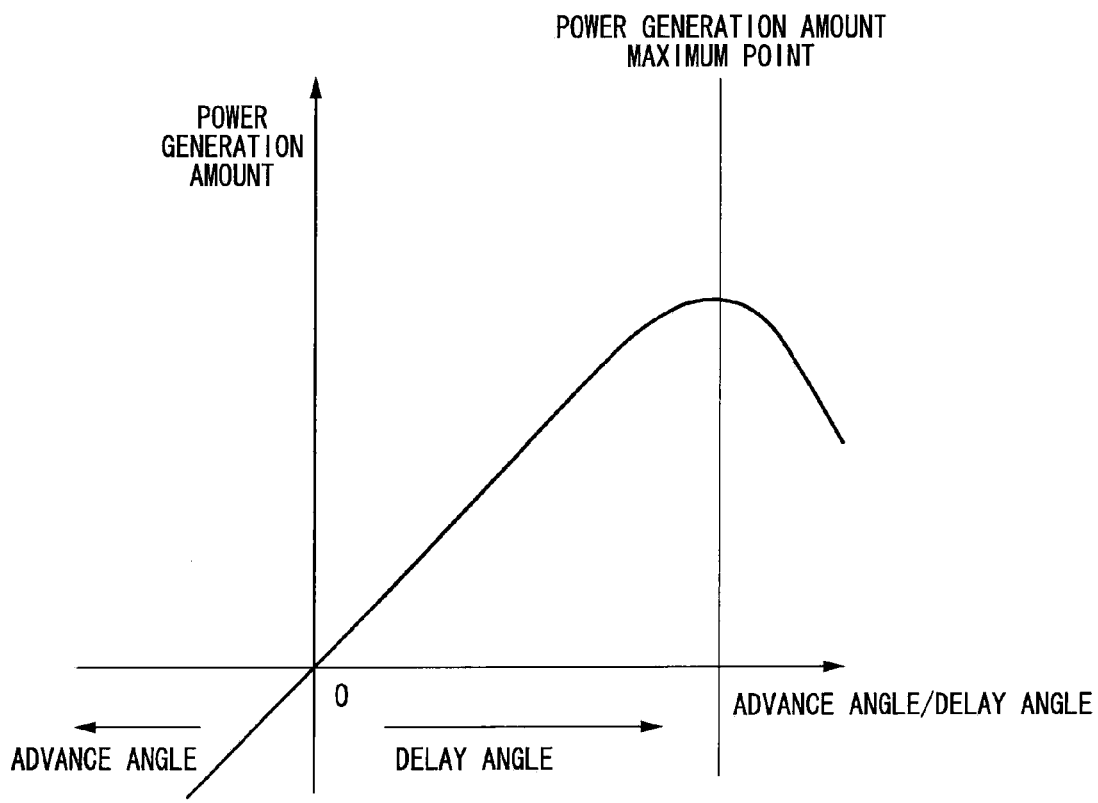
FIG. 12 is a view used to illustrate advance angle/delay angle control.
Figure 13:
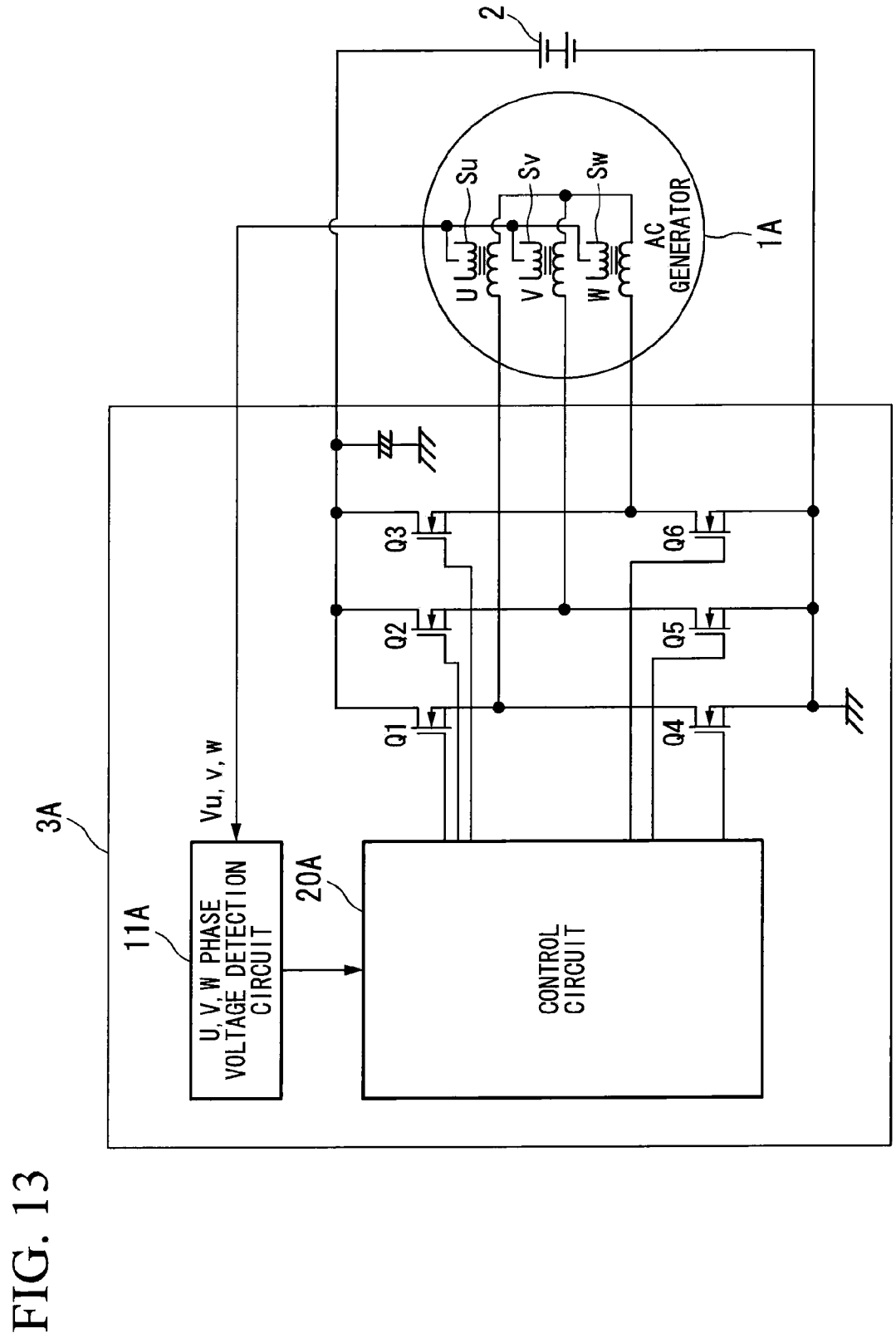
FIG. 13 is a circuit diagram showing an example of the structure of a conventional alternating current power generator.

By performing the above described processing, it is possible to automatically set a delay angle limit value that provides the maximum power generation amount (more accurately, that provides substantially the maximum power generation amount), and it is possible to perform advance angle/delay angle control such that the delay angle amount does not exceed this delay angle limit value. Moreover, as is shown in FIG. 10, it is revealed that there is a point where the power generation amount is at maximum in the space $\theta_A$, and when the delay angle amount is controlled to increase, it is possible for the delay angle to track the periphery of the point where the power generation amount is at maximum.

While embodiments of the invention have been described and illustrated above, it should be understood that the battery charging device and the U, V, W phase voltage generating circuit of the present invention are not limited solely to these embodiments, and various modifications can be made without departing from the spirit or scope of the present invention.

INDUSTRIAL APPLICABILITY

In the present invention, it is possible to perform advance angle/delay angle control without providing individual magnet position detectors (magnetic field detectors for detecting magnetic field of a rotor) or individual sub-coils (auxiliary coils for detecting alternating current output voltage) in each phase of an alternating current generator. Moreover, because the effect is achieved that it is possible to automatically set an optimum delay angle limit value irrespective of the alternating current generator, the type of battery, and the size of the engine (the displacement), the present invention is valuable for battery charging devices and the like.

The invention claimed is:

1. A battery charging device that is connected between a three-phase alternating current generator having U, V, and W phases and a battery, and is constructed so as to convert alternating current power output from the three-phase alternating current generator into direct current power and supply the direct current power to the battery, and that performs advance angle/delay angle control by either advancing or delaying an energization timing to switching elements of a rectifier portion having a bridge configuration relative to a phase of the alternating current output voltage from the three-phase alternating current generator, the device comprising:

an alternating current output voltage detection circuit that:
  detects an alternating current output voltage of any one phase of the three-phase alternating current generator, and
  includes a sub-coil which detects the alternating current output voltage of the any one phase of the three-phase alternating current generator;

a U, V, W phase voltage generating circuit that:
  generates a synchronous signal that is in synchronization with an alternating current output voltage of the one phase that is detected by the alternating current output voltage detection circuit,
  generates synchronous signals of the other two phases based on the synchronous signal of the one phase,
  generates a rectangular wave that is in synchronization with the alternating current output voltage of the one phase detected by the sub-coil as the synchronous signal,
  generates rectangular waves that are in synchronization with the other two phases based on the rectangular wave that is in synchronization with the one phase, and
  outputs the rectangular waves to a synchronous triangular wave generating circuit that generates triangular waves that are in synchronization with the rectangular waves of the respective phases;

an advance angle/delay angle calculation circuit that determines an advance angle/delay angle amount of the energization timing to the switching elements based on a signal of a differential voltage between a voltage of the battery and a predetermined target voltage, and the synchronous signals of the each phase that are output by the U, V, W phase voltage generating circuit; and an advance angle/delay angle control circuit that performs the advance angle/delay angle control of the switching elements using the advance angle/delay angle amount determined by the advance angle/delay angle calculation circuit.

2. The battery charging device according to claim 1, wherein:

the alternating current output voltage detection circuit detects an alternating current output voltage of the U phase; and the U, V, W phase voltage generating circuit includes
a circuit that generates a rectangular wave signal that is in synchronization with the alternating current output voltage of the U phase,
a first triangular wave generating circuit that generates a first triangular wave in synchronization with a phase from 0° to 180° of a rectangular wave that is in synchronization with the U phase,
a second triangular wave generating circuit that generates a second triangular wave in synchronization with a phase from 180° to 360° of the rectangular wave that is in synchronization with the U phase,
a circuit that generates a V phase rectangular wave in which a level is inverted at a voltage point of two thirds a peak voltage of the first triangular wave, and in which the level is inverted at a voltage point of two thirds a peak voltage of the second triangular wave, and
a circuit that generates a W phase rectangular wave in which a level is inverted at a voltage point of one third the peak voltage of the first triangular wave, and in which the level is inverted at a voltage point of one third the peak voltage of the second triangular wave.

3. The battery charging device according to claim 1, comprising:
a power generation amount calculation circuit that detects an alternating current output voltage and an alternating current output current of one phase of the three-phase alternating current generator, and calculates a power generation amount of the alternating current generator;
an advance angle/delay angle control circuit that performs the advance angle/delay angle control of the switching elements using the advance angle/delay angle amount determined by the advance angle/delay angle calculation circuit, and that, when a delay angle amount exceeds a delay angle limit value in case where delay angle control is performed, performs delay angle control of the switching elements using the delay angle limit value; and
a delay angle limit value setting circuit that stores the delay angle amount and the power generation amount, and compares a previous delay angle amount and a previous power generation amount with a current delay angle amount and a current power generation amount, and when the current delay angle amount is larger than the previous delay angle amount and the previous power generation amount is larger than the current power generation amount, sets the previous delay angle amount as the delay angle limit value.

4. The battery charging device according to claim 3, wherein:
the advance angle/delay angle control circuit performs delay angle control of the switching elements using the determined delay angle amount when the advance angle/delay angle amount determined by the advance angle/delay angle calculation circuit is a delay angle amount, and either the delay angle limit value is not set or the delay angle amount is less than the delay angle limit value; and
the delay angle limit value setting circuit stores the delay angle amount and the power generation amount, and compares the previous delay angle amount and the previous power generation amount with the current delay angle amount and the current power generation amount,
the delay angle limit value setting circuit sets the previous delay angle amount as the delay angle limit value when the current delay angle amount is larger than the previous delay angle amount and the previous power generation amount is larger than the current power generation amount, and
the delay angle limit value setting circuit cancels a setting of the delay angle limit value when the current delay angle amount is smaller than the previous delay angle amount.

5. The battery charging device according to claim 1, wherein:
the advance angle/delay angle calculation circuit includes a comparator circuit that is connected to an error amplifier that compares the voltage of the battery with the predetermined target voltage and outputs an error signal, and determines an advance angle/delay angle amount by comparing the triangular waves output from the synchronous triangular wave generating circuit with an output of the error amplifier;
the advance angle/delay angle control circuit receives the advance angle/delay angle amounts from the comparator circuit, and performs advance angle/delay angle control of the switching elements using the advance angle/delay angle amounts; and
the battery charging device further comprises a current sensor that detects the alternating current output current of the any one phase of the three-phase alternating current generator, a power generation amount calculation circuit that calculates a power generation amount of the alternating current generator based on the output voltage of the three-phase alternating current generator detected by the sub-coil, and on the output current of the three-phase alternating current generator detected by the current sensor, and a delay angle limit value setting circuit that stores the delay angle amount determined by the comparator circuit and the power generation amount determined by the power generation amount calculation circuit, and compares a previous delay angle amount and a previous power generation amount with a current delay angle amount and a current power generation amount, and when the current delay angle amount is larger than the previous delay angle amount and the previous power generation amount is larger than the current power generation amount, sets the previous delay angle amount as a delay angle limit value.

6. The battery charging device according to claim 1, wherein:
the triangular wave in the synchronous triangular wave generating circuit is generated for each of the U phase, the V phase, and the W phase; and
in the comparator circuit, when advance the angle/delay angle amount is determined by comparing the triangular wave output from the synchronous triangular wave generating circuit with the output of the error amplifier,
an advance angle/delay angle amount of the U phase is determined by comparing the triangular wave of the W phase output from the synchronous triangular wave generating circuit with the output from the error amplifier,
an advance angle/delay angle amount of the V phase is determined by comparing the triangular wave of the U phase output from the synchronous triangular wave generating circuit with the output from the error amplifier, and
an advance angle/delay angle amount of the W phase is determined by comparing the triangular wave of the V phase output from the synchronous triangular wave generating circuit with output from the error amplifier.

7. In a battery charging device that is connected between a three-phase alternating current generator having U, V, and W phases and a battery, and is constructed so as to convert alternating current power output from the three-phase alternating current generator into direct current power and supply the direct current power to the battery, and that performs advance angle/delay angle control by either advancing or delaying an energization timing to switching elements of a rectifier portion having a bridge configuration relative to a phase of the alternating current output voltage from the three-phase alternating current generator, determines an advance angle/delay angle amount of the energization timing to the switching elements based on a signal of a differential voltage between a voltage of the battery and a predetermined target voltage, and synchronous signals of each phase of the alternating current output voltage from the three-phase alternating current generator, a three-phase voltage generating circuit that generates the synchronous signals of the each phase of the alternating current output voltage, the circuit comprising:
a circuit that, based on a signal of the alternating current output voltage of any one phase of the three-phase alternating current generator, generates a signal that is in synchronization with the one phase;

a circuit that generates synchronous signals of the other two phases based on the synchronous signal of the one phase;

a circuit that generates a rectangular wave signal that is in synchronization with an alternating current output voltage of the U phase;

a first triangular wave generating circuit that generates a first triangular wave in synchronization with a phase from 0° to 180° of a rectangular wave that is in synchronization with the U phase;

a second triangular wave generating circuit that generates a second triangular wave in synchronization with a phase from 180° to 360° of the rectangular wave that is in synchronization with the U phase;

a circuit that generates a V phase rectangular wave in which a level is inverted at a voltage point of two thirds a peak voltage of the first triangular wave, and in which the level is inverted at a voltage point of two thirds a peak voltage of the second triangular wave; and a circuit that generates a W phase rectangular wave in which a level is inverted at a voltage point of one third the peak voltage of the first triangular wave, and in which the level is inverted at a voltage point of one third the peak voltage of the second triangular wave.

8. In a battery charging device that is connected between a three-phase alternating current generator and a battery, and is constructed so as to convert alternating current power output from the three-phase alternating current generator into direct current power and supply the direct current power to the battery, and that performs advance angle/delay angle control by either advancing or delaying an energization timing to switching elements of a rectifier portion having a bridge configuration relative to a phase of the alternating current output voltage from the three-phase alternating current generator, determines an advance angle/delay angle amount of the energization timing to the switching elements based on a signal of a differential voltage between a voltage of the battery and a predetermined target voltage, and on synchronous signals of each phase of the alternating current output voltage from the three-phase alternating current generator, a three-phase voltage generation method for generating the synchronous signals of the each phase of the alternating current output voltage, the method comprising:

a step of generating, based on a signal of the alternating current output voltage of any one phase of the three-phase alternating current generator, a signal that is in synchronization with the one phase; and a step of generating synchronous signals of the other two phases based on the synchronous signal of the one phase;

a step of generating a rectangular wave signal that is in synchronization with an alternating current output voltage of a U phase;

a first triangular wave generation step of generating a first triangular wave in synchronization with a phase from 0° to 180° of a rectangular wave that is in synchronization with the U phase;

a second triangular wave generation step of generating a second triangular wave in synchronization with a phase from 180° to 360° of the rectangular wave that is in synchronization with the U phase;

a step of generating a V phase rectangular wave in which a level is inverted at a voltage point of two thirds a peak voltage of the first triangular wave, and in which the level is inverted at a voltage point of two thirds a peak voltage of the second triangular wave; and a step of generating a W phase rectangular wave in which a level is inverted at a voltage point of one third the peak voltage of the first triangular wave, and in which the level is inverted at a voltage point of one third the peak voltage of the second triangular wave.

9. A delay angle control method in a battery charging device that is connected between a three-phase alternating current generator having U, V, and W phases and a battery, and is constructed so as to convert alternating current power output from the three-phase alternating current generator into direct current power and supply the direct current power to the battery, and that performs advance angle/delay angle control by either advancing or delaying an energization timing to switching elements of a rectifier portion having a bridge configuration relative to a phase of the alternating current output voltage from the three-phase alternating current generator, the method comprising:

an alternating current output voltage detection step of detecting an alternating current output voltage of any one phase of the three-phase alternating current generator;

an alternating current output current detection step of detecting an alternating current output current of the any one phase of the three-phase alternating current generator;

a U, V, W phase voltage generation step of generating a synchronous signal is generated that is in synchronization with the alternating current output voltage of the one phase that is detected in the alternating current output voltage detection step, and generating synchronous signals of the other two phases based on the synchronous signal of the one phase;

a power generation amount calculation step of calculating a power generation amount of the three-phase alternating current generator based on the alternating current output voltage and on the alternating current output current of the one phase of the three-phase alternating current generator;

an advance angle/delay angle calculation step of determining an advance angle/delay angle amount of the energization timing to the switching elements based on a signal of a differential voltage between a voltage of the battery and a predetermined target voltage, and on the synchronous signals of the each phase that are output by the U, V, W phase voltage generating circuit;

an advance angle/delay angle control step of performing advance angle/delay angle control of the switching elements using the advance angle/delay angle amount determined by the advance angle/delay angle calculation step, and when a delay angle amount exceeds a delay angle limit value in case where delay angle control is performed, performing delay angle control of the switching elements using the delay angle limit value; and a delay angle limit value setting step of dynamically storing the delay angle amount and the power generation amount, and dynamically comparing a previous delay angle amount and a previous power generation amount with a current delay angle amount and a current power generation amount, and when the current delay angle amount is larger than the previous delay angle amount and the previous power generation amount is larger than the current power generation amount, setting the previous delay angle amount is set as the delay angle limit value.

* * * * *